(12) United States Patent
Shellhammer et al.

(10) Patent No.: US 10,080,125 B2
(45) Date of Patent: Sep. 18, 2018

(54) ULTRA LOW-POWER PAGING FRAMES FOR WAKE-UP AND DISCOVERY

(71) Applicant: QUALCOMM Incorporated, San Diego, CA (US)

(72) Inventors: Stephen Jay Shellhammer, Ramona, CA (US); Santosh Paul Abraham, San Diego, CA (US); Simone Merlin, Solana Beach, CA (US); Rahul Malik, San Diego, CA (US); Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 14/827,020

(22) Filed: Aug. 14, 2015

(65) Prior Publication Data

US 2016/0057605 A1    Feb. 25, 2016

Related U.S. Application Data

(60) Provisional application No. 62/039,482, filed on Aug. 20, 2014.

(51) Int. Cl.
*H04W 8/00* (2009.01)
*H04W 52/02* (2009.01)
(Continued)

(52) U.S. Cl.
CPC .......... *H04W 8/005* (2013.01); *H04W 12/04* (2013.01); *H04W 12/06* (2013.01); *H04W 12/10* (2013.01);
(Continued)

(58) Field of Classification Search
CPC ..... H04W 56/00; H04W 12/10; H04W 8/005; H04L 63/123
See application file for complete search history.

(56) References Cited

U.S. PATENT DOCUMENTS 8,953,547 B2   2/2015  Huang et al.
9,137,823 B1   9/2015  Liu et al.
(Continued)

OTHER PUBLICATIONS

ETRI: "Discussion on Discovery for D2D Proximity Services," 3GPP Draft; R2-132589 Discussion on Discovery for D2D Proximity Services, 3rd Generation Partnership Project (3GPP), Mobile Competence Centre ; 650, Route Des Lucioles ; F-06921 Sophia-Antipolis Cedex vol. RAN WG2, No. Barcelona, Spain; 20130819-20130823, Aug. 9, 2013 (Aug. 9, 2013), XP050718249, Retrieved from the Internet: URL:http://www.3gpp.org/ftp/tsg_ran/WG2_RL2/TSGR2_83/Docs/ [retrieved on Aug. 9, 2013].
(Continued)

*Primary Examiner* — David Oveissi
(74) *Attorney, Agent, or Firm* — Patterson & Sheridan, L.L.P.

(57) ABSTRACT

Certain aspects of the present disclosure generally relate to wireless communications and, more particularly, to ultra low-power paging frames for wake up and discovery. One example apparatus for wireless communications generally includes at least one interface configured to receive via a first radio and a second radio, wherein the at least one interface receives a paging frame from another apparatus via the second radio while the first radio is in a first power state that is lower than a second power state of the second radio; and a processing system configured to take one or more actions based on a command field included in the paging frame.

32 Claims, 16 Drawing Sheets

(51) Int. Cl.
*H04W 68/00* (2009.01)
*H04W 12/04* (2009.01)
*H04W 12/06* (2009.01)
*H04W 68/02* (2009.01)
*H04W 12/10* (2009.01)
*H04W 56/00* (2009.01)
*H04W 84/12* (2009.01)
*H04L 29/06* (2006.01)
*H04W 88/06* (2009.01)
*H04W 76/27* (2018.01)
*H04W 76/14* (2018.01)

(52) U.S. Cl.
CPC ... *H04W 52/0216* (2013.01); *H04W 52/0219* (2013.01); *H04W 52/0225* (2013.01); *H04W 52/0229* (2013.01); *H04W 56/00* (2013.01); *H04W 56/001* (2013.01); *H04W 68/005* (2013.01); *H04W 68/02* (2013.01); *H04L 63/123* (2013.01); *H04W 52/0209* (2013.01); *H04W 76/14* (2018.02); *H04W 76/27* (2018.02); *H04W 84/12* (2013.01); *H04W 88/06* (2013.01); *Y02D 70/00* (2018.01); *Y02D 70/142* (2018.01); *Y02D 70/164* (2018.01)

(56) References Cited

U.S. PATENT DOCUMENTS

| | | |
|---|---|---|
| 2002/0133534 A1 | 9/2002 | Forslow et al. |
| 2004/0077383 A1 | 4/2004 | Lappetelainen et al. |
| 2009/0144550 A1 | 6/2009 | Arunan |
| 2009/0219846 A1* | 9/2009 | Chan .................. H04W 68/12 370/311 |
| 2009/0286564 A1* | 11/2009 | Ho .................. H04W 56/00 455/502 |
| 2010/0135263 A1 | 6/2010 | Zakrzewski |
| 2010/0195552 A1 | 8/2010 | Ho |
| 2010/0268949 A1 | 10/2010 | Schuetze |
| 2011/0107075 A1 | 5/2011 | Kwak |
| 2012/0119902 A1 | 5/2012 | Patro et al. |
| 2012/0174216 A1 | 7/2012 | Vukovic et al. |
| 2013/0155905 A1* | 6/2013 | Sampath .................. H04W 48/16 370/255 |
| 2013/0329658 A1 | 12/2013 | Liu |
| 2014/0050320 A1 | 2/2014 | Choyi et al. |
| 2014/0112229 A1 | 4/2014 | Merlin et al. |
| 2014/0192985 A1 | 7/2014 | Wentink et al. |
| 2015/0040195 A1 | 2/2015 | Park et al. |
| 2015/0237069 A1 | 8/2015 | Rochon et al. |
| 2015/0244619 A1 | 8/2015 | Zheng et al. |
| 2015/0304950 A1* | 10/2015 | Li .................. H04W 52/0216 370/311 |
| 2016/0057703 A1 | 2/2016 | Benoit et al. |
| 2016/0212781 A1* | 7/2016 | Gao .................. H04W 8/005 |
| 2017/0311149 A1 | 10/2017 | Shellhammer et al. |

OTHER PUBLICATIONS

International Search Report and Written Opinion—PCT/US2015/045532—ISA/EPO—Nov. 13, 2015.

Texas Instruments: "Scenarios and Requirements for Device to Device Proximity Services", 3GPP Draft; R1-130103, 3rd Generation Partnership Project (3GPP), Mobile Competence Centre ; 650, Route Des Lucioles ; F-06921 Sophia-Antipolis Cedex ; France vol. Ran WG1, No. St Julian; 2013012 20130201 Jan. 19, 2013 (Jan. 19, 2013), XP050663549, Retrieved from the Internet: URL:http://www.3gpp.org/ftp/tsg_ran/WG1_RL1/TSGR1_72/Docs/ [retrieved on Jan. 19, 2013].

* cited by examiner

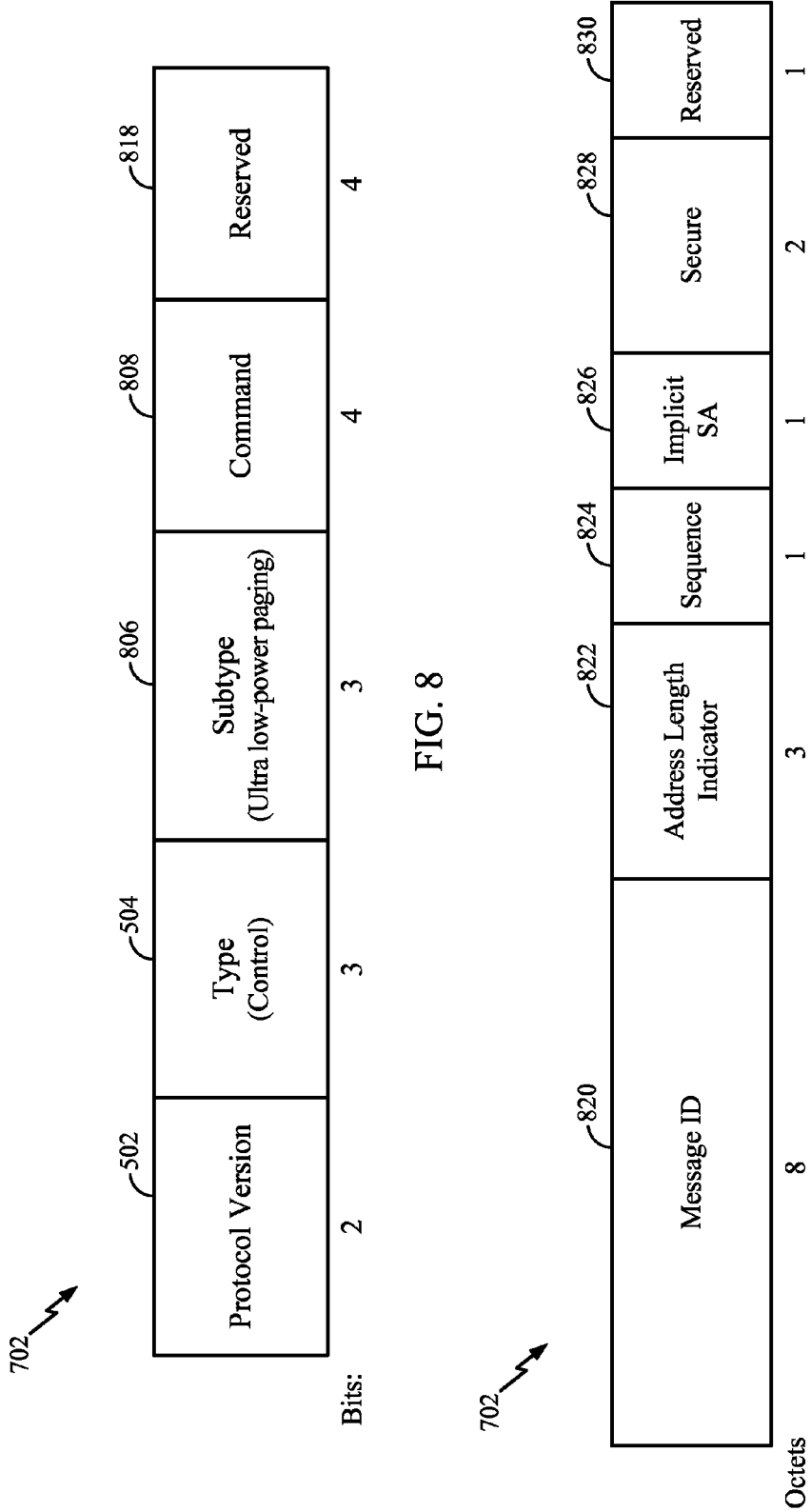

ULTRA LOW-POWER PAGING FRAMES
FOR WAKE-UP AND DISCOVERY

CROSS-REFERENCE TO RELATED
APPLICATION(S)

This application claims benefit of U.S. Provisional Patent Application Ser. No. 62/039,482, filed Aug. 20, 2014, which is herein incorporated by reference in its entirety.

BACKGROUND

Field of the Disclosure

Certain aspects of the present disclosure generally relate to wireless communications and, more specifically, to ultra low-power paging frames (e.g., short medium access control (MAC) frames) for wake-up and discovery.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than wireless ranges associated with frequency ranges of other IEEE 802.11 technologies and potentially fewer issues associated with path losses due to obstructions.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide for ultra low-power paging frames (e.g., short medium access control (MAC) frames) for wake-up and discovery.

Certain aspects of the present disclosure provide an apparatus for wireless communications. The apparatus generally includes at least one interface configured to receive via a first radio and a second radio, wherein the at least one interface receives a paging frame from another apparatus via the second radio while the first radio is in a first power state that is lower than a second power state of the second radio; and a processing system configured to take one or more actions based on a command field included in the paging frame.

Certain aspects of the present disclosure provide an apparatus for wireless communications. The apparatus generally includes a processing system configured to determine whether another apparatus is capable of receiving a paging frame, via a second radio of the other apparatus, while a first radio is in a first power state that is lower than a second power state of the second radio and based on the determination, generate a paging frame comprising a command field that indicates one or more actions for the other apparatus to take; and at least one interface configured to output the paging frame for transmission to the other apparatus.

Certain aspects of the present disclosure provide a method for wireless communications by a user equipment (UE). The method generally includes receiving a paging frame from an apparatus via a second radio while a first radio is in a first power state that is lower than a second power state of the second radio and taking one or more actions based on a command field included in the paging frame.

Certain aspects of the present disclosure provide a method for wireless communications by an apparatus. The method generally includes determining whether another apparatus is capable of receiving a paging frame, via a second radio of the other apparatus, while a first radio is in a first power state that is lower than a second power state of the second radio, based on the determination, generating a paging frame comprising a command field that indicates one or more actions for the other apparatus to take, and outputting the paging frame for transmission to the other apparatus.

Certain aspects of the present disclosure provide an apparatus for wireless communications. The apparatus generally includes means for receiving a paging frame from another apparatus via a second radio while a first radio is in a first power state that is lower than a second power state of the second radio and means for taking one or more actions based on a command field included in the paging frame.

Certain aspects of the present disclosure provide an apparatus for wireless communications. The apparatus generally includes means for determining whether another apparatus is capable of receiving a paging frame, via a second radio of the other apparatus, while a first radio is in a first power state that is lower than a second power state of the second radio, means for generating, based on the determination, a paging frame comprising a command field that indicates one or more actions for the other apparatus to take, and means for outputting the paging frame for transmission to the other apparatus.

Certain aspects of the present disclosure provide a computer readable medium. The computer readable medium generally includes computer executable code stored thereon for: receiving a paging frame from an apparatus via a second radio while a first radio is in a first power state that is lower than a second power state of the second radio, and taking one or more actions based on a command field included in the paging frame.

Certain aspects of the present disclosure provide a computer readable medium. The computer readable medium generally includes computer executable code stored thereon for: determining whether an apparatus is capable of receiving a paging frame, via a second radio of the other apparatus, while a first radio is in a first power state that is lower than a second power state of the second radio; based on the determination, generating a paging frame comprising a command field that indicates one or more actions for the apparatus to take, and outputting the paging frame for transmission to the apparatus.

Certain aspects of the present disclosure provide an access terminal. The access terminal generally includes a first radio, a second radio configured to receive a paging frame from an apparatus while the first radio is in a first power state that is lower than a second power state of the second radio, and a processing system configured to take one or more actions based on a command field included in the paging frame.

Certain aspects of the present disclosure provide an access point. The access point generally includes at least one antenna and a processing system configured to: determine whether an apparatus is capable of receiving a paging frame, via a second radio of the other apparatus, while a first radio is in a first power state that is lower than a second power state of the second radio; based on the determination, generate a paging frame comprising a command field that indicates one or more actions for the apparatus to take; and transmit the paging frame, via the at least one antenna, to the apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A illustrates an example short control frame format, according to certain aspects of the present disclosure.

FIGS. 8-8A illustrate example subfields of the FC field of a short control frame for ultra-low power paging, in accordance with certain aspects of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
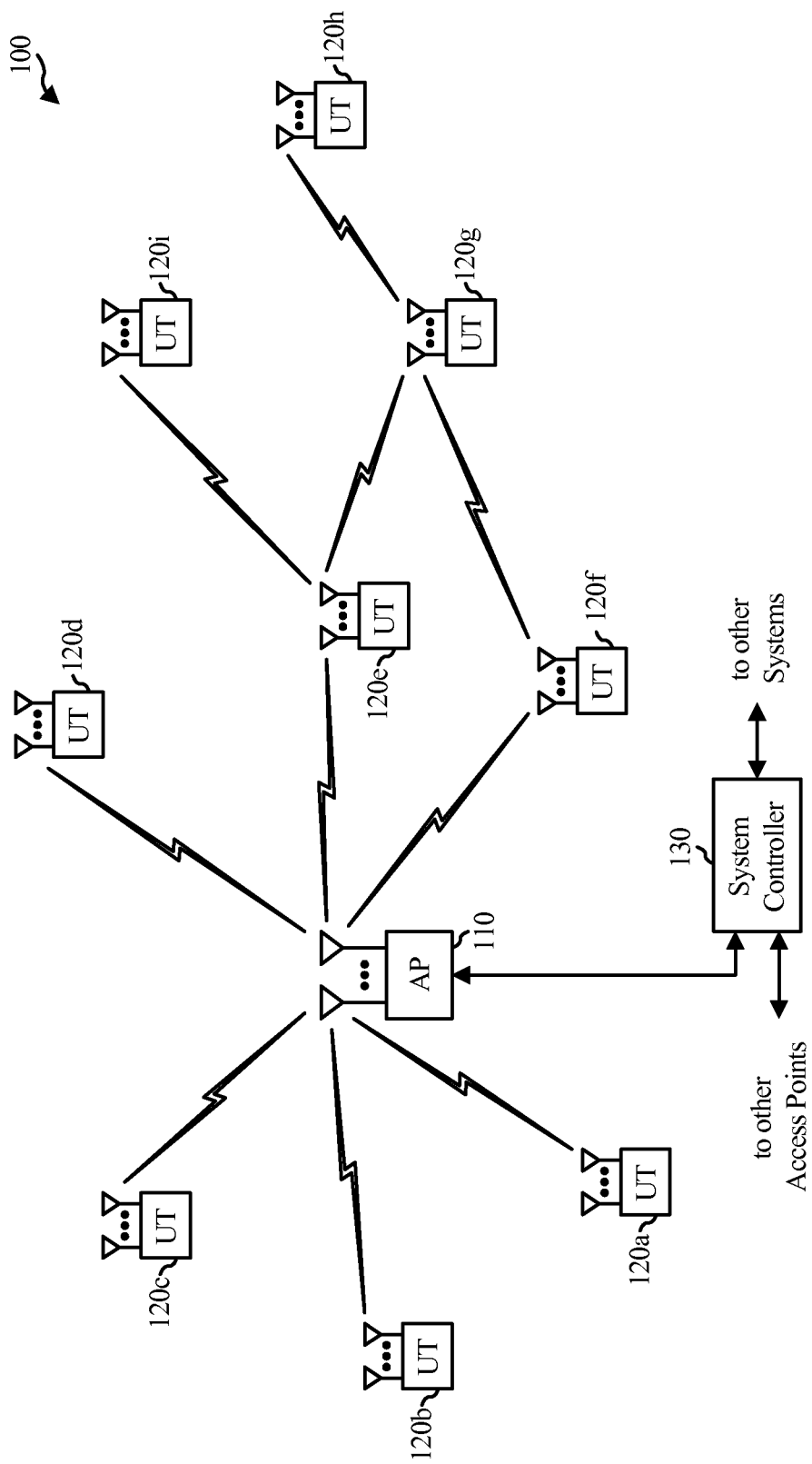
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Techniques and apparatus are provided herein for ultra low-power paging frames (e.g., short medium access control (MAC) frames) for wake-up and discovery. In aspects, techniques are provided for determining whether another apparatus is capable of receiving a paging frame (e.g., an ultra low-power paging frame), via a second radio (e.g., a companion radio), while a first radio (e.g., a primary radio) is in a low-power state and to generate and transmit, to the other apparatus, a paging frame comprising a command field (e.g., a message ID field) that indicates one or more actions for the other apparatus to take.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may use sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system uses orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may use interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

FIG. 1 illustrates a system 100 in which aspects of the disclosure may be performed. For example, the access point 110 or user terminal 120 may determine whether another access point 110 or user terminal 120 is capable of receiving a paging frame (e.g., an ultra low-power paging frame) via a second radio (e.g., a companion radio), while a first radio (e.g., a primary radio) is in a low-power state. The access point 110 or user terminal 120 may generate and transmit the paging frame comprising a command field (e.g., a message ID field) that indicates one or more actions for the other access point 110 or user terminal 120 to take.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 may couple to and provide coordination and control for the access point.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The access point 110 and user terminals 120 employ multiple transmit and multiple receive antennas for data transmission on the downlink and uplink. For downlink MIMO transmissions, $N_{ap}$ antennas of the access point 110 represent the multiple-input (MI) portion of MIMO, while a set of K user terminals represent the multiple-output (MO) portion of MIMO. Conversely, for uplink MIMO transmissions, the set of K user terminals represent the MI portion, while the $N_{ap}$ antennas of the access point 110 represent the MO portion. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also use a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
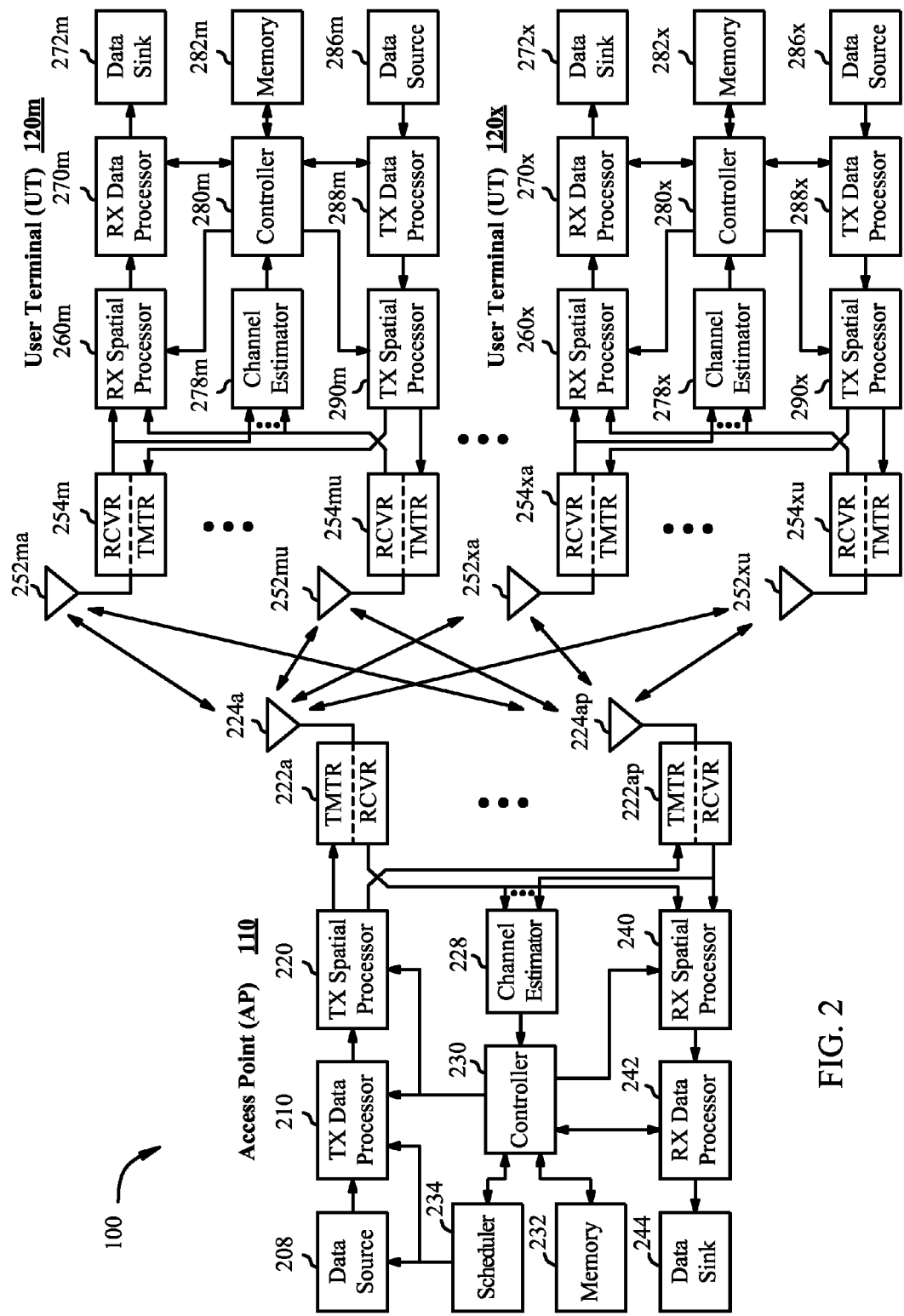
FIG. 2 illustrates a block diagram of an example access point (AP) and user terminals (UTs), in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 may be used to perform the operations described herein and illustrated with reference to FIGS. 17-18A. Similarly, antenna 252, Tx/Rx 254, processors 260, 270, 288, and 290, and/or controller 280 of the UT 120 may be used to perform the operations described herein and illustrated with reference to FIGS. 17-18A.

FIG. 2 illustrates a block diagram of access point 110 and two user terminals 120m and 120x in MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink. For SDMA transmissions, $N_{up}$ user terminals simultaneously transmit on the uplink, while $N_{dn}$ user terminals simultaneously transmit on the downlink. $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal. The decoded data for each user terminal may be provided to a data sink 272 for storage and/or a controller 280 for further processing.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix Hdn,m for that user terminal Controller 230 derives the spatial filter matrix for the access point based on the effective uplink channel response matrix Hup,eff. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
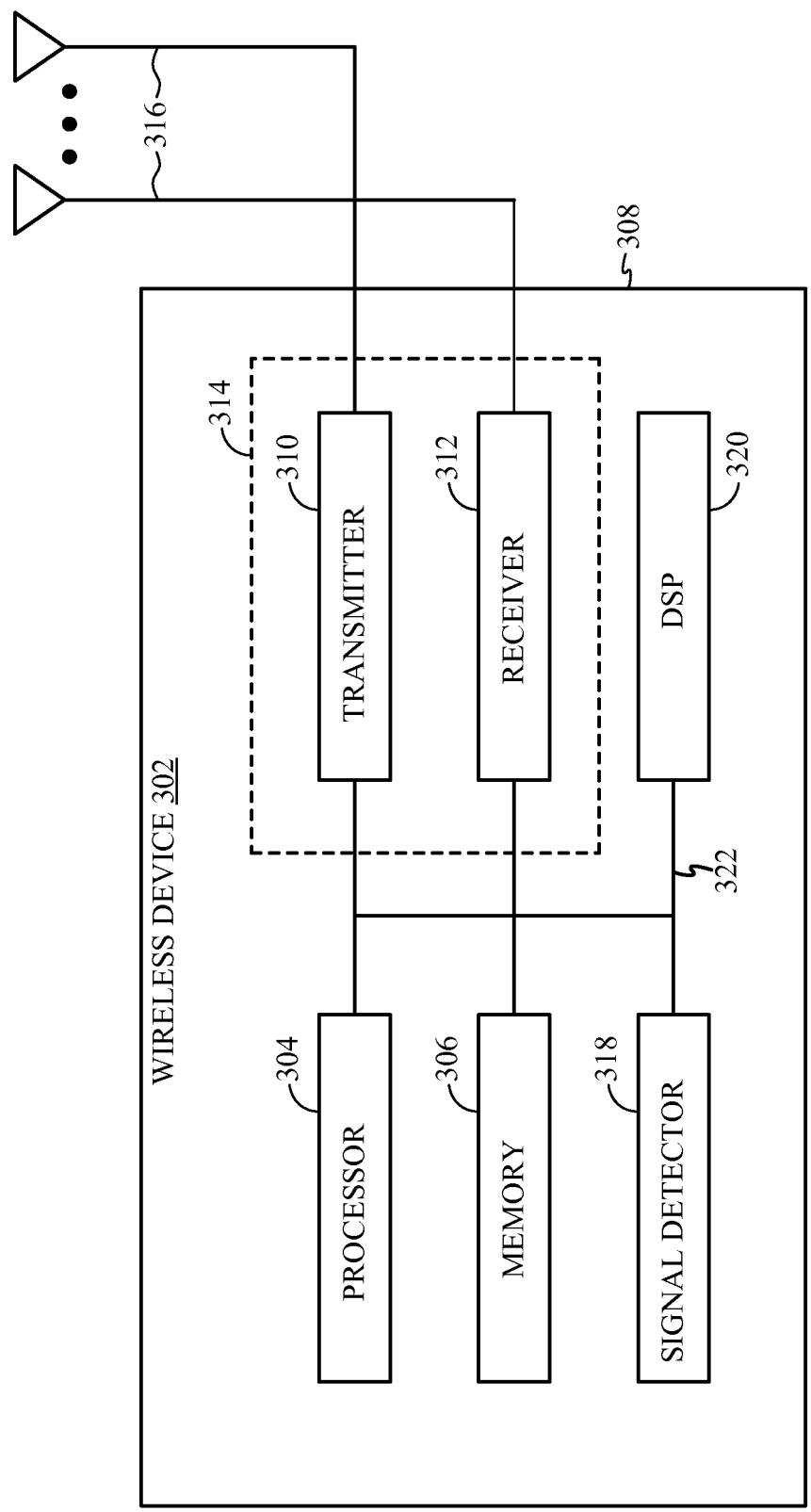
FIG. 3 illustrates a block diagram of an example wireless device, in accordance with certain aspects of the present disclosure.

FIG. 3 illustrates example components that may be utilized in the AP 110 and/or UT 120 to implement aspects of the present disclosure. For example, the transmitter 310, antenna(s) 316, processor 304 and/or the DSP 320 may be used to practice aspects of the present disclosure implemented by the AP. Further, the receiver 312, antenna(s) 316, processor 304 and/or the DSP 320 may be used to practice aspects of the present disclosure implemented by the UT.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Short Control Frames

In certain systems (e.g., IEEE 802.11ah systems), a short frame may be a medium access control (MAC) protocol data unit (MPDU) having a protocol version field in a frame control field (FCF) set to 1.

Figure 4:
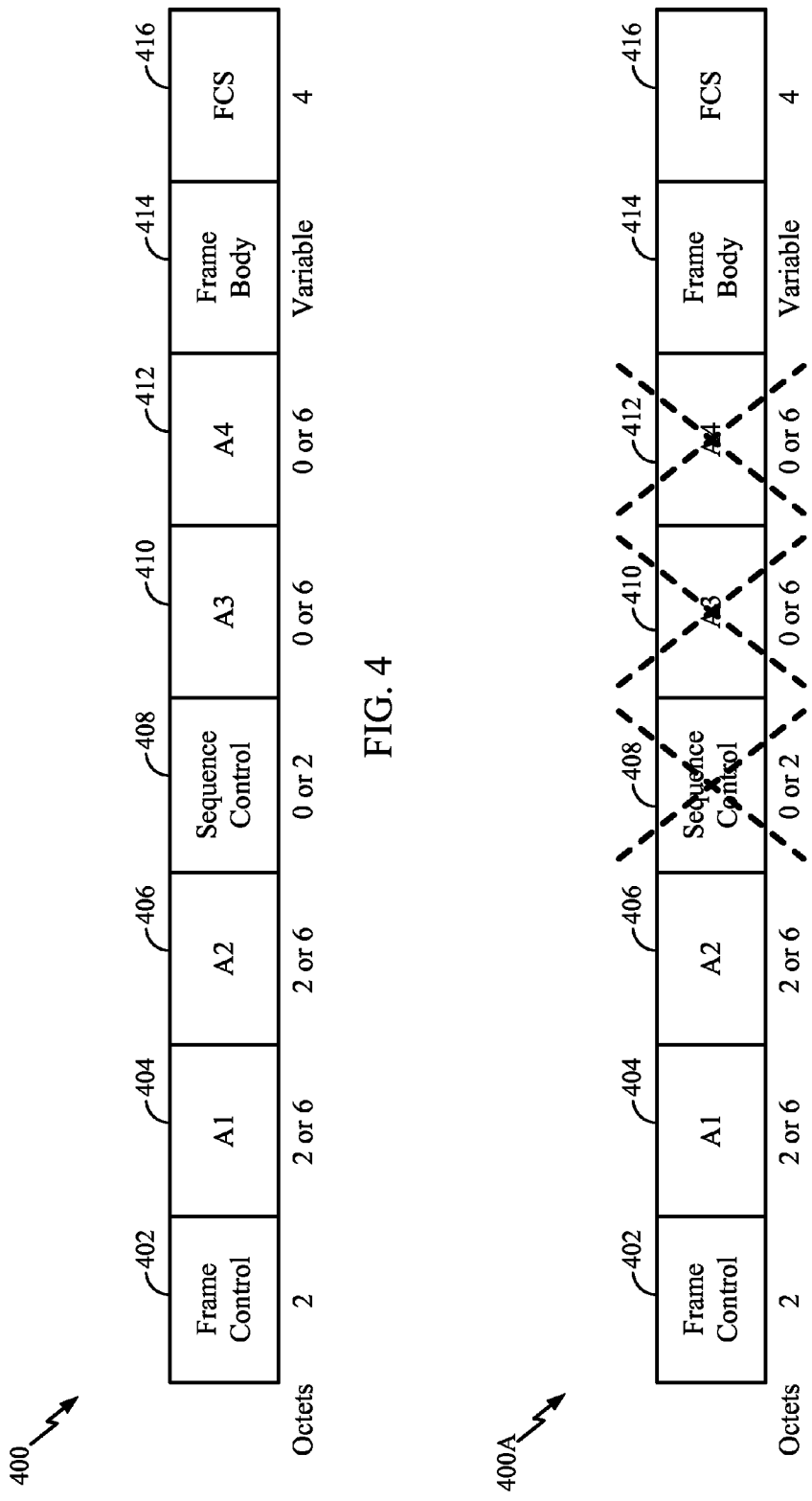
FIG. 4 illustrates an example short frame format, according to certain aspects of the present disclosure.

FIG. 4 illustrates an example short frame format 400, according to certain aspects of the present disclosure. As shown in FIG. 4, the short frame format 400 may include a 2-byte Frame Control (FC) field 402, a 2-byte or 6-byte first Address field (A1) 404, a 2-byte or 6-byte second Address field (A2) 406, a 0-byte (e.g., not included) or 2-byte Sequence Control (SC) field 408, a 0-byte or 6-byte third Address (A3) field 410, a 0-byte or 6-byte fourth Address field (A4) 412, a variable length Frame Body field 414, and a 4-byte Frame Check Sequence (FCS) field 416.

For short control frames, the A1 field 404 and A2 field 406 may be present; however, the SC field 408, A3 field 410, and A4 field 412 may not be present (e.g., 0 bits) in the short frame format 400, as shown in FIG. 4A, for example.

Figure 5:
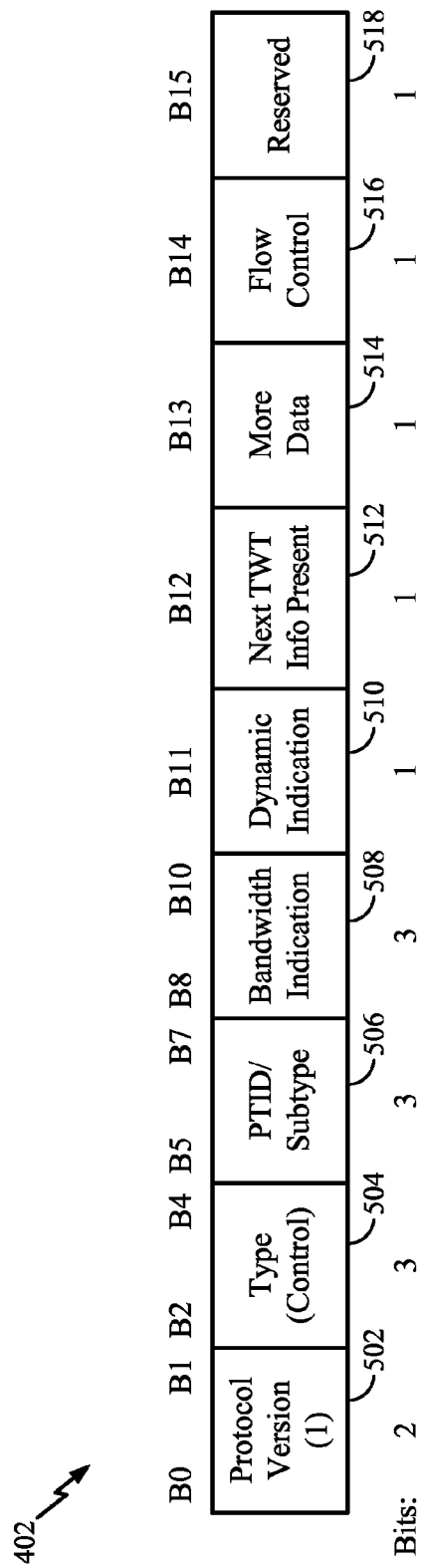
FIG. 5 illustrates subfields of the FC field 402, in accordance with certain aspects of the present disclosure.

FIG. 5 illustrates subfields of the 16-bit (2-byte) FC field 402 or a PV1 short control frame, in accordance with certain aspects of the present disclosure. As shown in FIG. 5, the FC field 402 may include a 2-bit Protocol Version (PV) subfield 502 set to 1 for short control frames. The FC field 402 may further include a 3-bit Type subfield 504 indicating Control type, a 3-bit PTID/Subtype subfield 506, a 3-bit Bandwidth Indication subfield 508, a 1-bit Dynamic Indication subfield 510, a 1-bit Next TWT Info Present subfield 512, a 1-bit More Data subfield 514, a 1-bit Flow Control subfield 516, a Reserved bit 518.

Example Ultra-Low Power Paging

Ultra-low power PHY enables an ultra-low power super-regenerative receiver (e.g., a receiver which consumes less than 200 µA on a 3 volt battery) and, thus, enables a number of ultra-low power use cases—some of which are discussed in more detail below. Additionally, ultra-low power paging frames may be defined for use with each of the ultra-low power use cases. The use cases may include, but are not limited to, primary radio wake-up, Wi-Fi Direct Discovery Assist, Social Wi-Fi Discovery Assist, and Association Assist.

Figure 6:
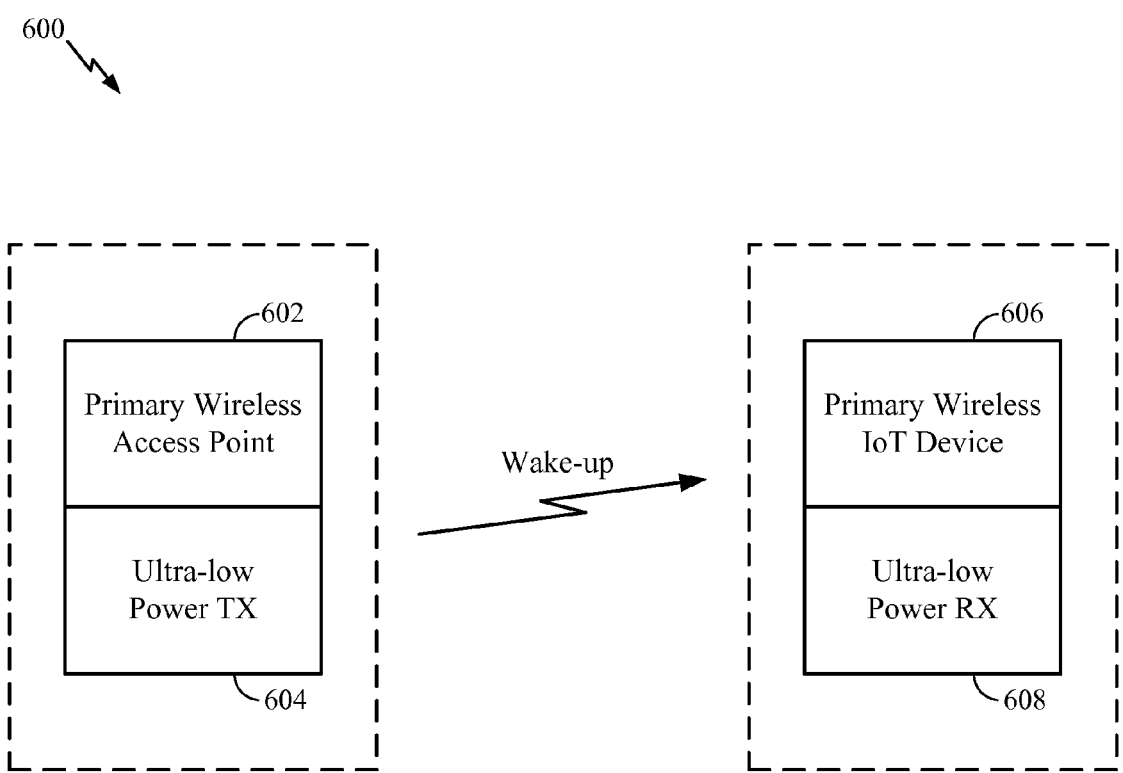
FIG. 6 illustrates a block diagram of an example ultra-low power transmitter as a companion radio to a primary AP radio in communication with an ultra-low power receiver as a companion to a primary Internet-of-Things (IoT) device radio, in accordance with certain aspects of the present disclosure.

According to certain aspects, the receivers/transmitters used for the ultra-low power use cases described herein may be a standalone radio, or may operate as a companion radio to a primary radio (e.g., a Wi-Fi radio) as shown in FIG. 6. In one example, illustrated in FIG. 6, an ultra-low power transmitter 604 may be used as a companion radio to the primary wireless access point radio 602. The ultra-low power transmitter 604 may communicate—in this example, for wakeup—with ultra-low power receiver 608, which may be a companion radio to primary wireless Internet-of Things (IOT) device 606. In one example non-limiting implementation, the ultra-low power paging frame companion radio may operate in sub-1 GHz (S1G) bands (e.g., as described in IEEE 802.11ah) or in the 2.4 GHz band (e.g., as described in IEEE 802.11n). According to certain aspects, the ultra-low power receiver may provide long, but the PHY data rate for ultra-low power paging may be 31.25 kb/s. According to certain aspects, the MAC frames defined for ultra-low power paging may be based, for example, on short control and/or management frames (e.g., using Protocol Version 1), for example, as illustrated in FIGS. 4, 4A, and 5 above.

According to certain aspects, ultra-low power paging may decrease power consumption and increase battery life in each of the use cases described herein.

Example Ultra Low-Power Paging Frames

Figure 7:
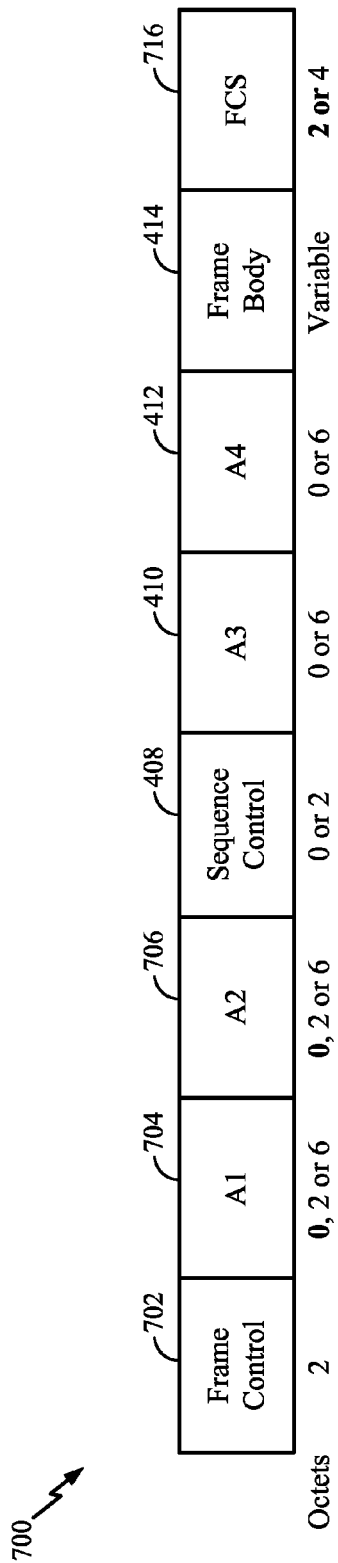
FIG. 7 illustrates an example short control frame format for ultra-low power paging, in accordance with certain aspects of the present disclosure.

FIG. 7 illustrates an example short control frame format 700 for ultra-low power paging, in accordance with certain aspects of the present disclosure. According to certain aspects, the frame can also be a management frame. As shown in FIG. 7, the short control frame format 700 may include a 2-byte frame control field 702. The receiver address field (A1) 704 and transmitter address field (A2) 706 may not be needed, thus, the short control frame format 700 may include 0-, 2-, or 6-byte A1 and A2 fields. The short control frame format 700 may include the 0- or 2-byte Sequence Control field 408, the 0- or 6-byte A3 field 410 and A4 field 412, and variable length Frame Body field 414 as in the example short frame format 400. Since it is a control frame, the FCS field 716 may be sufficiently reliable (e.g., because data is not being sent) with only 1-byte or 2-bytes or, alternatively, the FCS field 716 may be 4-bytes.

Figure 7A:
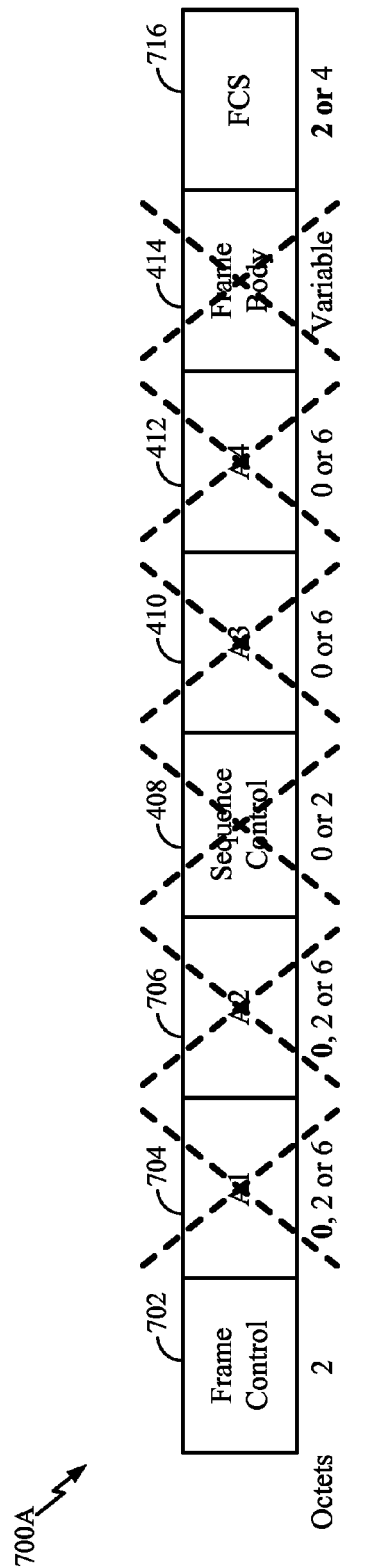
FIG. 7A illustrates an example short control frame format for ultra-low power paging that lacks address fields, sequence control field, and frame body field, in accordance with certain aspects of the present disclosure.

Thus, for ultra-low power paging frames, the FC field may always include the frame control field 702 and the FCS field 716. However, various other fields may either not be included or a different may be included in their place. FIG. 7A illustrates an example short control frame format that lacks the address fields 704, 706, 410, 412, the Sequence Control field 408, and the Frame Body field 414.

Figure 7B:
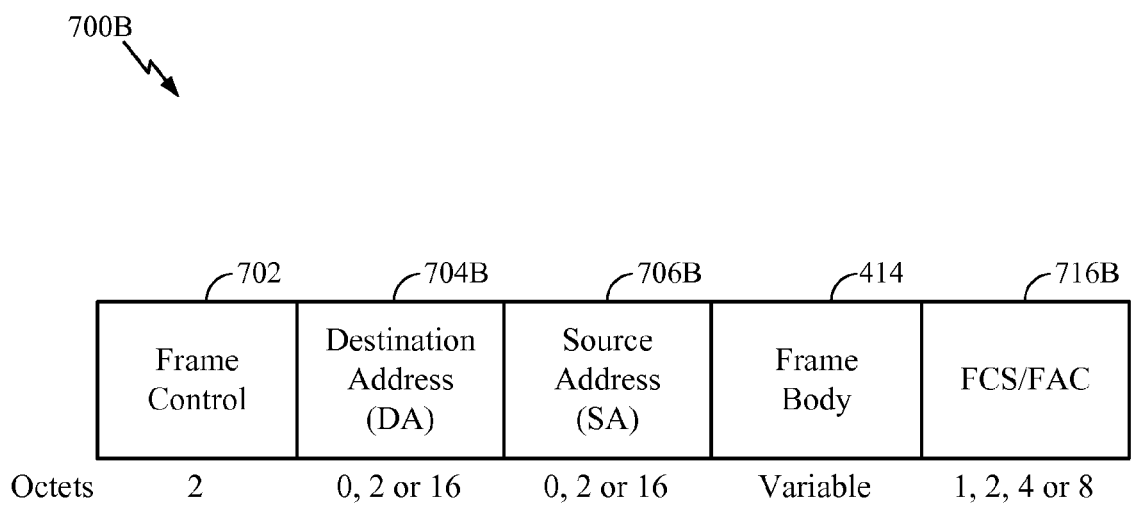
FIG. 7B illustrates an example short control frame format for ultra-low power paging, in accordance with certain aspects of the present disclosure.

According to certain aspects, the receiver address field (A1) 704 may also be referred to as a destination address (DA) field and the transmitter address field (A2) may also be referred to as a source address (SA) field as shown in FIG. 7B. The DA field 704B and the SA field 706B may 0, 2, or 16 octets. According to certain aspects, the FCS field may also be Frame Authentication Code (FAC) field 716B. Whereas FCS is used for non-secure frames to confirm no error bits, FAC is used for secure frame to provide authentication of unaltered frames.

According to certain aspects, for ultra-low power paging, a new Frame Control (FC) field format may be defined for Short Control/Management MAC frames. According to certain aspects, the new FC field for ultra-low power paging frames may include a new Command subfield when the Subtype subfield in the FC field indicates ultra-low power paging frame as the subtype as shown in FIG. 8. According to certain aspects, the value of the Command subfield may notify the receiver how to parse the remainder of the frame (e.g., primary radio wake-up, clock resync, Wi-Fi Direct Device Discovery Assist, Social Wi-Fi Discovery Assist, Association Assist).

FIG. 8 illustrates a frame control (FC) field 702 format for ultra-low power paging short control frames 700-700B, in accordance with certain aspects of the present disclosure. As shown in FIG. 8, the FC field 702 may include Protocol Version subfield 502 set to 1, the Type subfield 504 set to two to indicate control, a Subtype subfield 806 indicating ultra low-power paging. The FC field 702 may eliminate the other subfields of the FC field 402. Additionally, the FC field 702 may include a Command subfield 808 and up to four reserved bit subfield 818. The Command subfield 808 may provide additional signaling. For example, the Command subfield 808 may signal that the frame is a Primary Radio Wake-up frame, a Clock Resynchronization frame, a Wi-Fi Direct Device Discovery Assist frame, a Social Wi-Fi Discovery Assist frame, or an Association Assist frame.

According to certain aspects, the FC field 702 format for ultra-low power paging short control frames 700-700B may include a message ID field 820, an address length indicator field 822, a sequence field 824, an implicit SA field 826, a Secure field 828, and a reserved field 830. The message ID field 820 may include the information of the type field 504, the subtype field 806, and the command field 808. A message ID of all zeros may indicate data frame and any other value may indicate control frame. In one example implementation, a value of 0 of the message ID field 820 may indicate the frame is for data, a value of 1 may indicate the frame is for primary radio wake-up, a value of 2 may indicate the frame is for clock synchronization, a value of 3 may indicate the frame is for social Wi-Fi discovery assist, and a value of 5 may indicate the frame is for Wi-Fi association assist.

The address length indicator field 822 may indicate length of DA and SA. In one example implementation, the implicit SA field 826 may be set (e.g., to 0) to indicate the SA is not included in the MAC frame or set (e.g., to 1) to indicate implicit 2-byte SA used in FCS/FAC calculation but not transmitted in the MAC frame. The sequence bit may be used in a data frame to indicate the frame number (e.g., 0 or 1) and may not be used for control frames. The secure field 828 may indicate whether FCS or FAC and length of the FCS or FAC.

As mentioned above, the DA field 704B and SA field 706B may have a length of 0, 2, or 16 bytes. The length of the fields may be indicated using the 3-bytes in the address length indicator field 822. In one example implementation, a value of 000 may indicate a 0-byte DA length and SA length, a value of 001 may indicate a 0-byte DA length and 2-byte SA length, a value of 010 may indicate a 2-byte DA length and 0-byte SA length, a value of 011 may indicate a 2-byte DA length and 2-byte SA length, a value of 100 may indicate a 0-byte DA length and 16-byte SA length, and a value of 101 may indicate a 16-byte DA length and 16-byte SA length. According to certain aspects, 0-byte DA may be used in broadcast frames and a 0-byte SA may be used for implicit SA locally assigned by the companion radio. A 2-byte DA and/or 2-byte SA may be locally assigned by the companion radio for a variety of applications. A 16-byte SA and/or a 16-byte DA may be randomly generated and may be used for standalone ultra-low power radios.

In some implementations, ultra-low power paging short control frames may be used between a station and other non-AP stations. In some implementations, ultra-low power paging short control frames may be used between a station and an AP. According to certain aspects, STAs and/or APs may perform a capability exchange in order to determine whether the STAs and/or APs support ultra-low power communications. For example, whether the receiver is an ultra-low power receiver and whether the transmitter is configured to transmit ultra-low power paging frames.

Primary Radio Wake-up

According to certain aspects, an ultra-low power paging short control frame 600 may be used as a primary radio wake-up frame. In this case, the Command subfield 708 of the FC field 402 may be set (e.g., Command=0) to indicate that the frame is a wake-up frame. According to certain aspects, the AP and STA agree on a periodic schedule when the STA is to listen for ultra-low power paging frames and synchronization frames. In an example implementation, the periodic schedule may be configured using the primary radio. As will be discussed in more detail below, a synchronization frame may allow the STAs to synchronize to the AP clock to limit clock drift.

Figure 9:
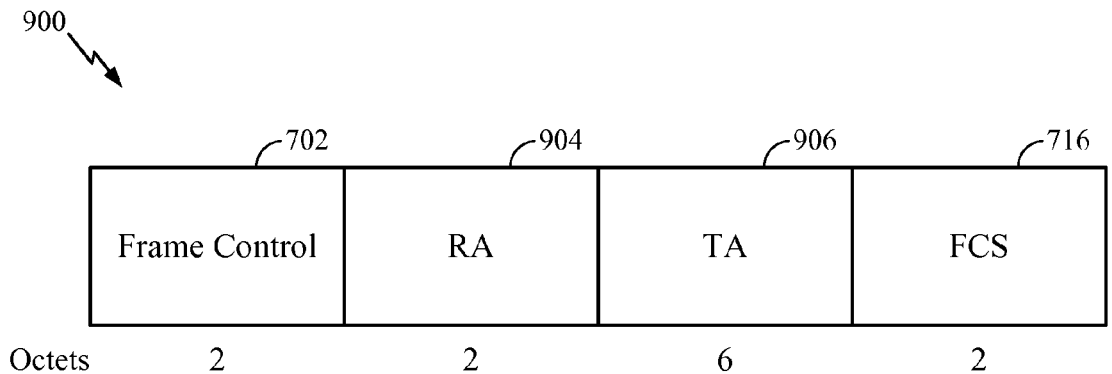
FIGS. 9-11 illustrate example ultra-low power paging frames for primary radio wake-up, in accordance with certain aspects of the present disclosure.

FIG. 9 illustrates an example ultra-low power paging frame 900 for primary radio wake-up, in accordance with certain aspects of the present disclosure. As shown in FIG. 9, the ultra-low power paging frame 900 may include the FC field 702 and FCS field 716. Additionally, the ultra-low power paging frame 900 may include a 2-byte RA field 904 (e.g., the A1 or DA field) and a 6-byte TA field 906 (e.g., the A2 or SA field). The RA field 904 may contain the short identifier (SID) of one or more non-AP STAs, for example, the STAs that are intended to wake up and listen for a Wi-Fi beacon. The TA field 906 may contain the address of the transmitter (e.g., an AP address or basic service set identifier (BSSID)). According to certain aspects, the TA field 906 may be 0-bytes where the SA is implicit. When an STA receives the wake-up frame, the STA may determine whether its SID matches an SID in the RA field 904 and the TA address matches the BSSID or address of the AP. The STA may then wake up its primary Wi-Fi radio to listen for the primary Wi-Fi beacon.

Figure 10:
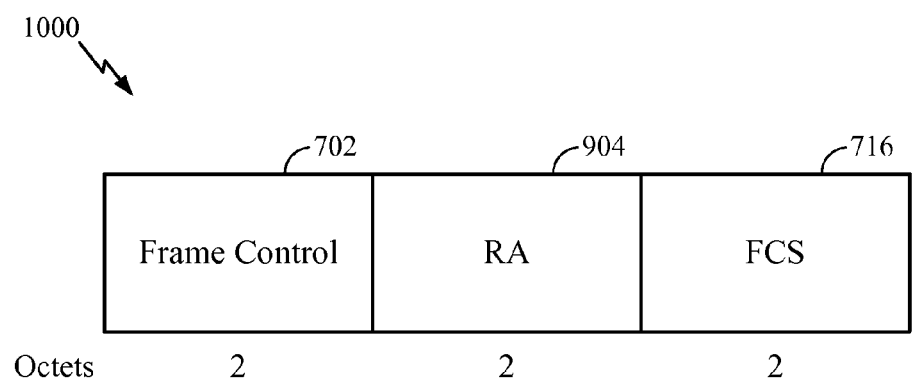

FIG. 10 illustrates an example ultra-low power paging frame 1000 for primary radio wake up. As mentioned, for implicit SA, the ultra-low power paging frame 1000 for primary radio wake up may omit the TA field 906. Instead, the FCS field 716 may be calculated using the transmitter address (e.g., a pre-stored transmitter address for an associated AP) and, thus, can confirm it is from the proper AP. This may reduce the size of the frame by 6-bytes.

Figure 11:
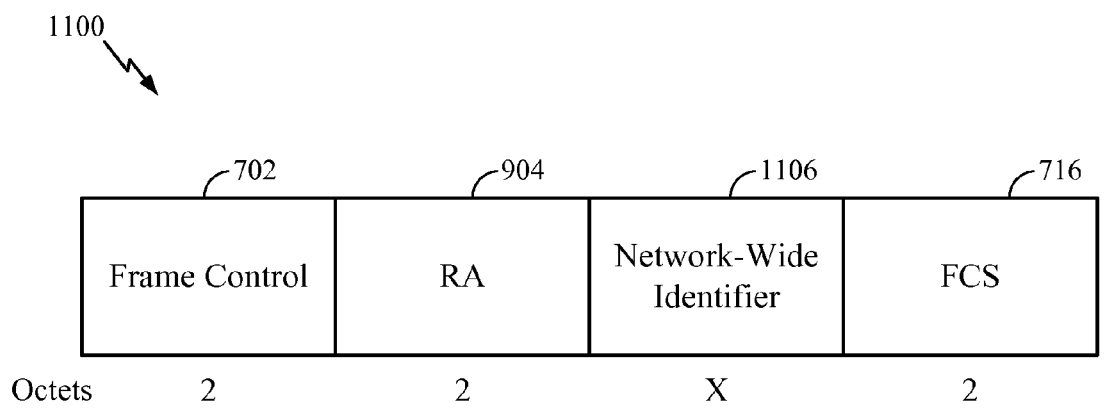

FIG. 11 illustrates an example ultra-low power paging frame 1100 for primary radio wake up. In yet another example implementation, the STA may receive wake-up frames from other devices than the associated AP. As shown in FIG. 11, the TA field 906 may be replaced with a Network-Wide Identifier (NWID) field 1106. The NWID may contain a NWID such as an SID, SSID, domain name, or a hashed version of the SID or SSID. According to certain aspects, a hashed SID or SSID may be hashed with other information to avoid matching with a common SSID (e.g., "Home"). For example, hashed with preshared key (PSK) credentials or domain name. According to certain aspects, the FCS field 716 may be calculated using a transmitter address as in the previous implementation.

This may allow a smartphone which is asleep to wander to a new area in the network and then be woken up by another AP in the network. This may also provide network-wide paging where if there is a message for the smartphone it can be woken-up and alerted anywhere in the network.

Clock Resynchronization

Clock resynchronization may allow non-AP STAs to resynchronize to the AP clock (e.g., in order to listen for Wi-Fi beacons from the AP). According to certain aspects, ultra-low power paging frames may be used for clock resynchronization. Resynchronization frames may be sent periodically to avoid allowing the clock in the non-AP STA to drift off too far from the clock in AP. According to certain aspects, the resynchronization frame may be sent during the agreed time window in which wake-up frame can be sent so that the non-AP will be in listening mode.

Due to carrier sense, it is possible the resynchronization frame is delayed from the scheduled transmit time (e.g., to avoid collisions or by regulations). According to certain aspects, a field may be included in the frame to allow the non-AP receiving STA to compensate for this delay (e.g., measured in μs). For example, the AP and STA may both maintain a counter (e.g., with a 1 μs resolution). Each time the AP transmits a synchronization frame, the AP includes the LSBs of its clock in the frame. There may be a fixed delay from the time the LSBs of the clock are captures until the frame is transmitted. The STA may compare the change in the LSBs of the clock and compare it to the LSBs of its clock to calculate the clock correction for synchronization.

Figure 12:
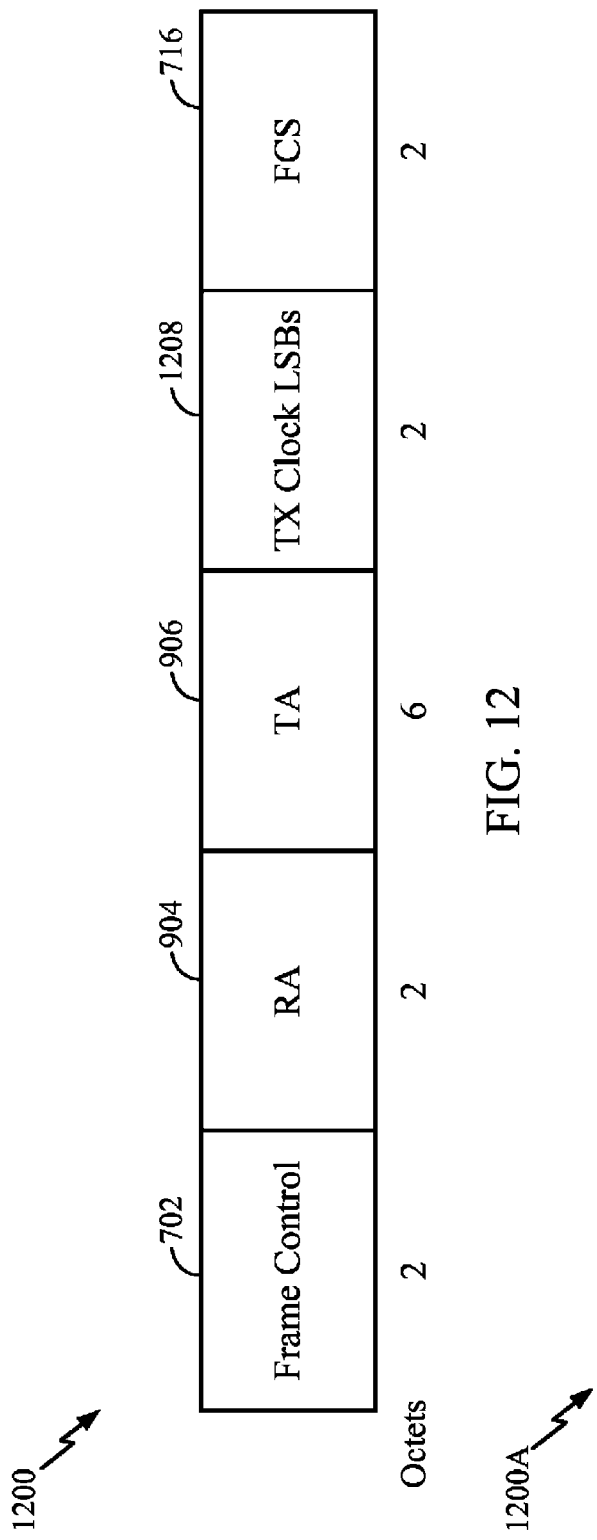
FIGS. 12-13 illustrate example ultra-low power paging frames for clock resynchronization, in accordance with certain aspects of the present disclosure.
Figure 12A:
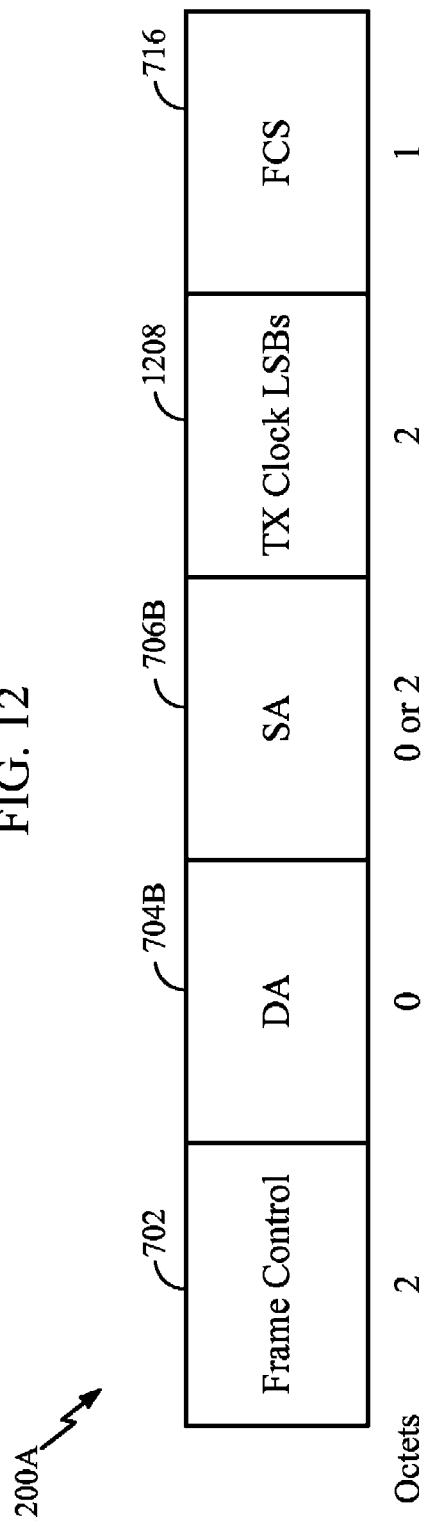

FIG. 12 illustrates an example ultra low-power paging frame 1200 for clock resynchronization, in accordance with certain aspects of the present disclosure. As shown in FIG. 12, the ultra low-power paging frame 1200 may include FC field 702 and the FCS field 716. The Command subfield 808 (e.g., the message ID field 820) of the FC field 702 may be set to indicate that the ultra low-power paging frame 1200 is clock resynchronization frame. The ultra low-power paging frame 1200 may include the RA field 904 (e.g., the A1 field 704 or the DA field 1204) and the TA field 906 (e.g., the A2 field 706 or the SA field 1206). The RA field 904 may contain the SIDs of non-AP STAs that are scheduled by the AP to listen for wake-up or resynchronization during the agreed time window. According to certain aspects, the an example ultra low-power paging frame 1200A may include a 0- or 2-byte DA field 1204 and/or a SA field 1206 and a 1-byte FCS field 716, as shown in FIG. 12A. Additionally, the ultra low-power paging frame 1200 may also include a TX Clock LSBs field 1208 that contains the least significant bits (LSBs) of the AP clock. The receiving STA may use the LSBs to correct for AP/STA clock offset. The STA may update its local clock to resynchronize with the AP clock.

Figure 13:
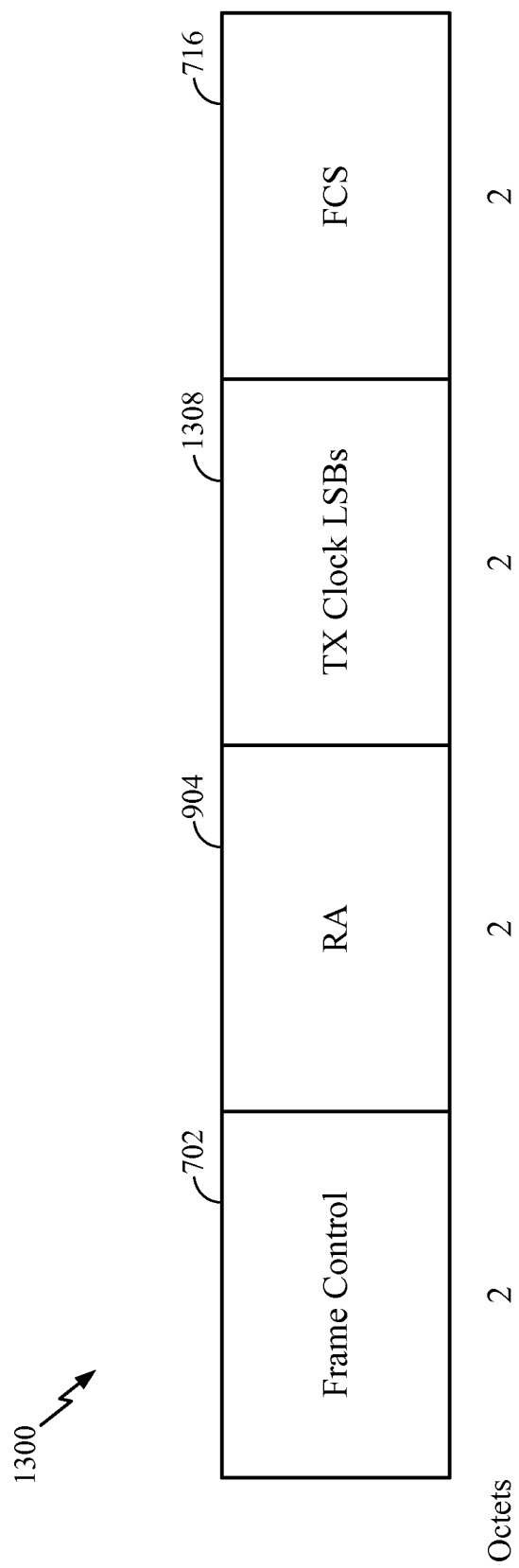

FIG. 13 illustrates an example ultra low-power paging frame 1300 for clock resynchronization, in accordance with certain aspects of the present disclosure. In another example implementation, the ultra-low power paging frame 1300 for clock resynchronization may omit the TA field 906. Instead, the FCS field 716 may be calculated using the transmitter address and, hence, can confirm it is from the proper AP. This may reduce the size of the frame by 6-bytes. The RA field 904 could also be omitted for broadcast frames.

In yet another example implementation, the STA may receive clock resynchronization frames from other devices than the associated AP. For example, although not shown in FIGS. 12-13, the TA field 906 may be replaced with a NWID field.

Wi-Fi Direct Discovery Assist

According to certain aspects, ultra-low power paging frames may be used for Wi-Fi Direct Discovery Assist. Wi-Fi Direct may be used for STAs (e.g., a laptop, tablet, cell phone, etc.) to communicate directly with other STAs (e.g., a printer, kiosk, etc.). In Wi-Fi Direct Discovery, the STA receiver may have a high duty cycle (e.g., close to 100%). Thus, STAs using Wi-Fi Direct Discovery may benefit from the use ultra-low power discovery assist. For example, this may enable battery-operated Wi-Fi Direct peripherals. Ultra low-power paging may be used to save power listening for other Wi-Fi Direct devices.

Figure 14:
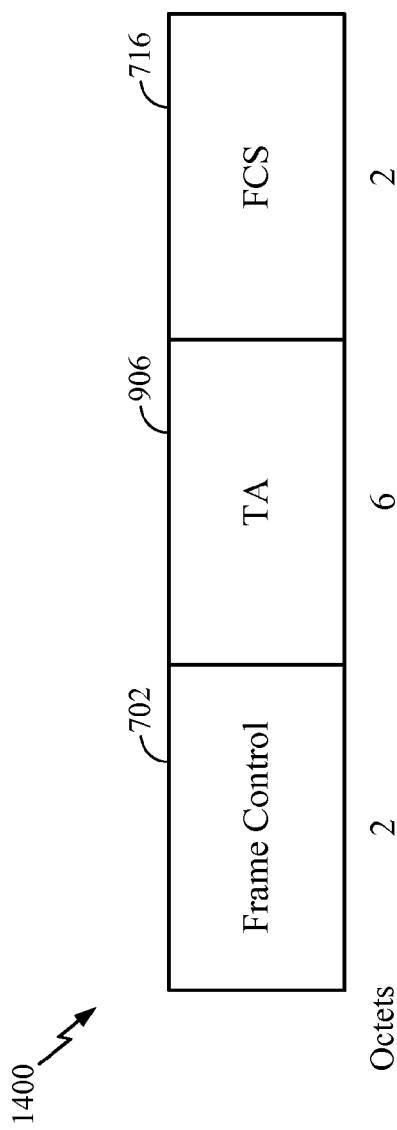
FIGS. 14-14A illustrate example ultra-low power paging frames for Wi-Fi Direct Discovery Assist, in accordance with certain aspects of the present disclosure.

FIG. 14 illustrates an example ultra-low power paging frame 1400 for Wi-Fi Direct Discovery Assist, in accordance with certain aspects of the present disclosure. As shown in FIG. 14, the example ultra-low power paging frame 1400 may include the FC field 702 and the FCS field 716. The Command subfield 808 (e.g., the Message ID field 820) of the FC field 702 may be set to indicate that the ultra-low power paging frame 1400 frame is a Wi-Fi Direct Discovery Assist frame. The ultra-low power paging frame 1400 frame may include the TA field 906 that contains the address of the transmitting Wi-Fi Direct STA. As shown in FIG. 14, no RA field is needed since the frame is used for discovery.

Figure 14A:
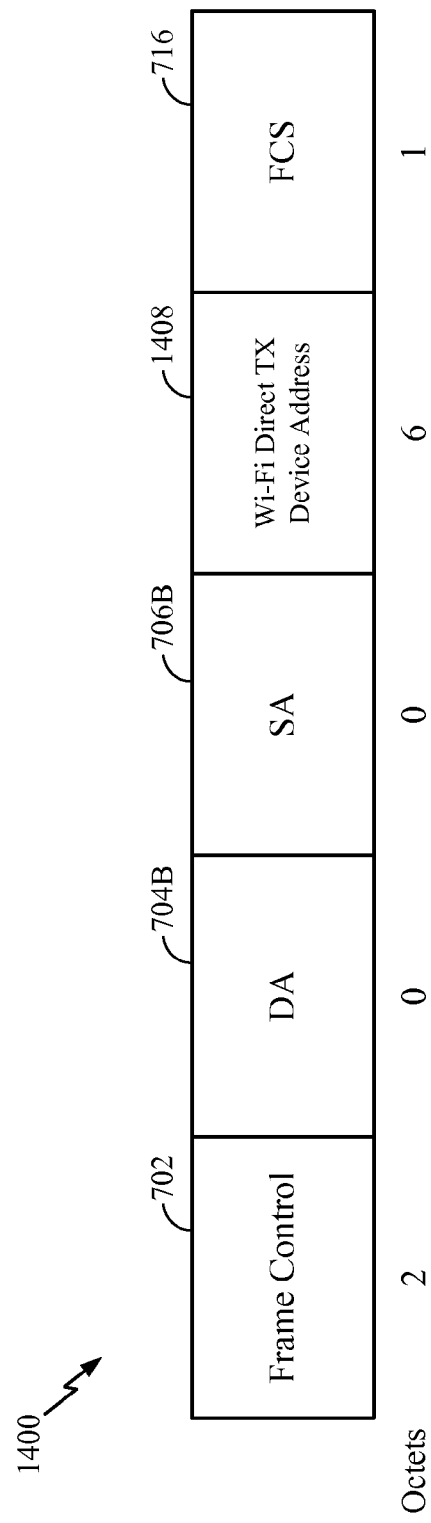

According to certain aspects, the ultra-low power paging frame may also omit the SA and may include a Wi-Fi Direct TX Device Address field 1408 (e.g., 6 octets) as shown in FIG. 14A.

According to certain aspects, once the STA discovers another Wi-Fi Direct device (e.g., by receiving ultra-low power paging frame 1400 or 1400A identifying the device in the TA field 906 or implicitly in the FCS field 716), standard Wi-Fi Direct protocol can take over. According to certain aspects, 5 GHz Wi-Fi devices skip searching on 2.4 GHz periodically.

Social Wi-Fi Discovery Assist

In Social Wi-Fi, portable devices (e.g., STAs) discover other nearby portable devices. The receiver in each STA may listen for frames from other STAs with a high duty cycle (e.g., 100%). According to certain aspects, ultra low-power paging frame can be used for Social Wi-Fi to provide reduced power operation.

An ultra low-power receiver can be on with high duty cycle (e.g. 100%) and listen for ultra low-power paging discovery assist frames, while allowing the primary radio to spend much of its time in sleep mode. The ultra low-power paging frame 1500 for discovery assist may indicate to the receiving STA that there is a nearby social Wi-Fi group and may provide information to the STA regarding the time offset between the ultra low-power paging frame 1500 for discovery assist and the primary radio discovery window and/or information regarding the Cluster ID of the group. The ultra low-power paging frame 1500 may indicate that the sender of the frame is associated with the nearby social group. By "associated", this could mean that the sender is a member of the nearby social group or could indicate that the sender could be associated with the nearby social group. The ultra low-power paging frame 1500 may be sent out periodically.

Figure 15:
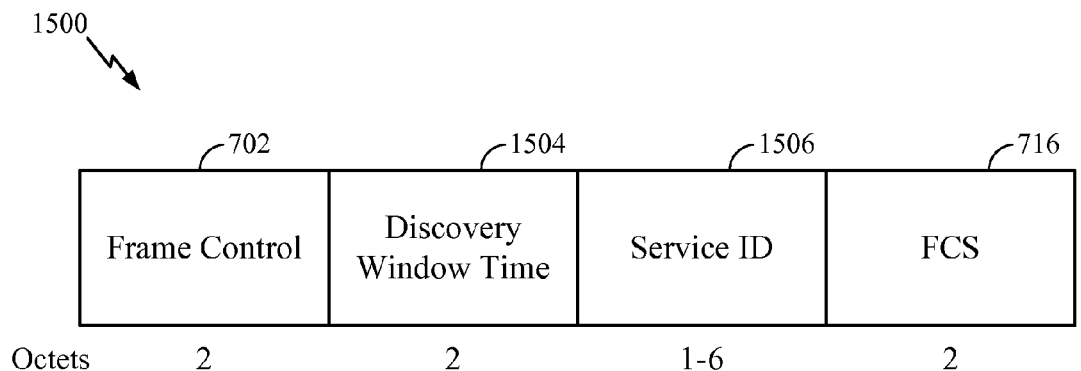
FIG. 15-15A illustrate example ultra low-power paging frames for Social Wi-Fi Discovery Assist, in accordance with certain aspects of the present disclosure.
Figure 15A:
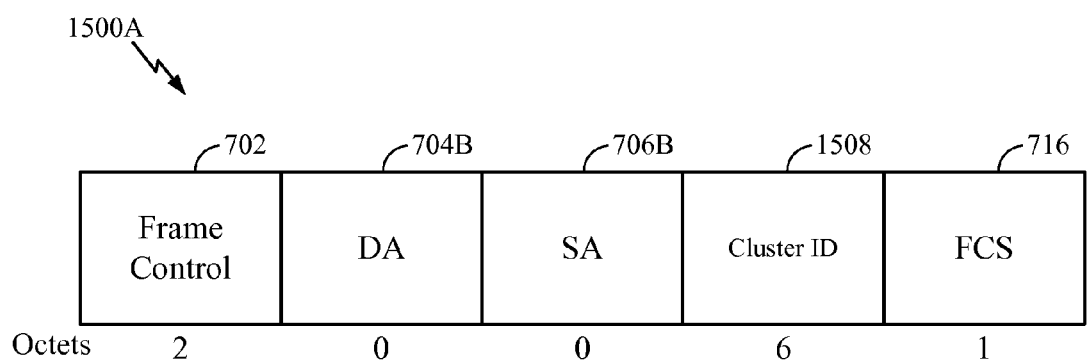

FIG. 15 illustrates an example ultra low-power paging frame 1500 for Social Wi-Fi Discovery Assist, in accordance with certain aspects of the present disclosure. As shown in FIG. 15, the example ultra low-power paging frame 1500 for Social Wi-Fi Discovery Assist may include the FC field 702 and FCS field 716. The Command subfield 808 (e.g., message ID field 820) of the FC field 702 may be set to indicate that example ultra low-power paging frame 1500 is a Social Wi-Fi Discovery Assist frame. Additionally, the example ultra low-power paging frame 1500 for Social Wi-Fi Discovery Assist includes a Discovery Window Time field 1504 and a Service ID field 1506. The Discovery Window Time field 1504 indicates the time until the next discovery window (e.g., measures in TUs). The Service ID field 1506 indicates the Social Wi-Fi Service ID. As shown in FIG. 15, the RA field and the TA field are not included. According to certain aspects, as shown in FIG. 15A, the Service ID field 1506 may also be referred to as a Cluster ID field 1508, the Discovery Window Time field 1504 may be omitted, and the FCS field 716 may be one byte. According to certain aspects, when the STAS receives the ultra low-power paging frame 1500 or 1500A, the STAS may notify the primary radio and provide the discovery window time and Service ID to the primary radio.

According to certain aspects, the transmitter address may be used to filter out when to notify the primary radio, based on instructions from the primary radio. In the context of Social Wi-Fi, the TA can be 2-bytes (e.g., eliminating the common 3-byte WFA OUI and the 1-byte Social Wi-Fi identifier). For example, a list or table may be maintained with SSIDs, or compressed SSIDs, of APs of interest, which may include previously associated APs.

Association Assist

According to certain aspects, ultra low-power paging frames can be used for association assist. For example, an AP may broadcast its service set identify (SSID) in the ultra-low power paging frames. An STA receiving the frame, may identify an AP of interest (e.g., home, work, etc.), notify the primary radio, and pass along association assist information. The primary can use low duty passive scanning to save power while still finding APs of interest with low latency.

Figure 16:
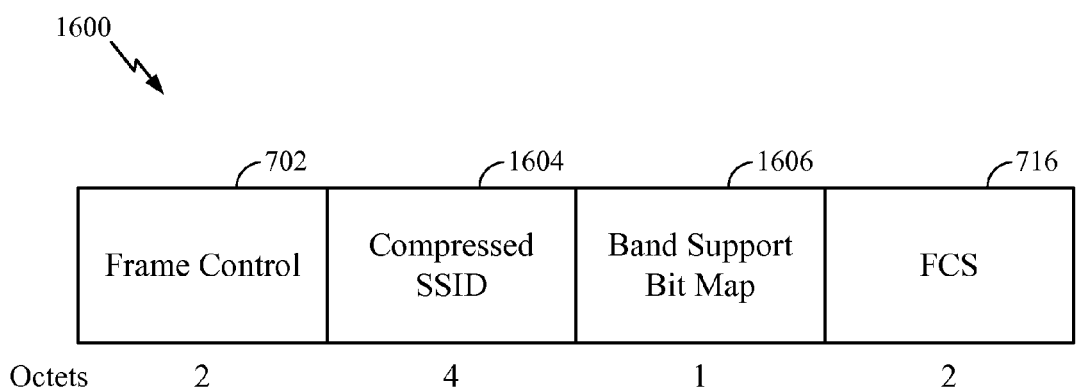
FIG. 16 illustrates an example ultra low-power paging frame 1500 for Association Assist, in accordance with certain aspects of the present disclosure.

FIG. 16 illustrates an example ultra low-power paging frame 1600 for Association Assist, in accordance with certain aspects of the present disclosure. The example ultra low-power paging frame 1600 may include the FC field 702 and the FCS field 716. The Command subfield 808 (e.g., Message ID field 820) of the FC field 702 may be set to indicate that the example ultra low-power paging frame 1600 is an Association Assist frame. Additionally, the example ultra low-power paging frame 1600 may include a Compressed SSID field 1604 and a Band Support Bit Map field 1606. The Compressed SSID field 1604 may contain a 4-byte hash of the network SSID. The Band Support Bit Map field 1606 may indicate which bands the AP supports. As shown in FIG. 16, the A1 and A2 fields may not be needed.

According to certain aspects, when the STA receives ultra low-power paging frame 1600, the STA may check to see if the SSID (e.g., in the Compressed SSID field 1604) matches any SSIDs in a "List of Relevant SSIDs". According to certain aspects, STAs may maintain (e.g., store in memory) a list of SSIDs of APs of interest (e.g., home, work, etc.) which typically include previously encountered APs or frequently used APs. According to certain aspects, if the SSID in the ultra low-power paging frame 1600 matches an SSID in the list, the STA may notify the primary radio and forward association assist information to the primary radio. According to certain aspects, the primary radio can then use low duty passive scanning to save power while still finding APs of interest with low latency.

Figure 17:
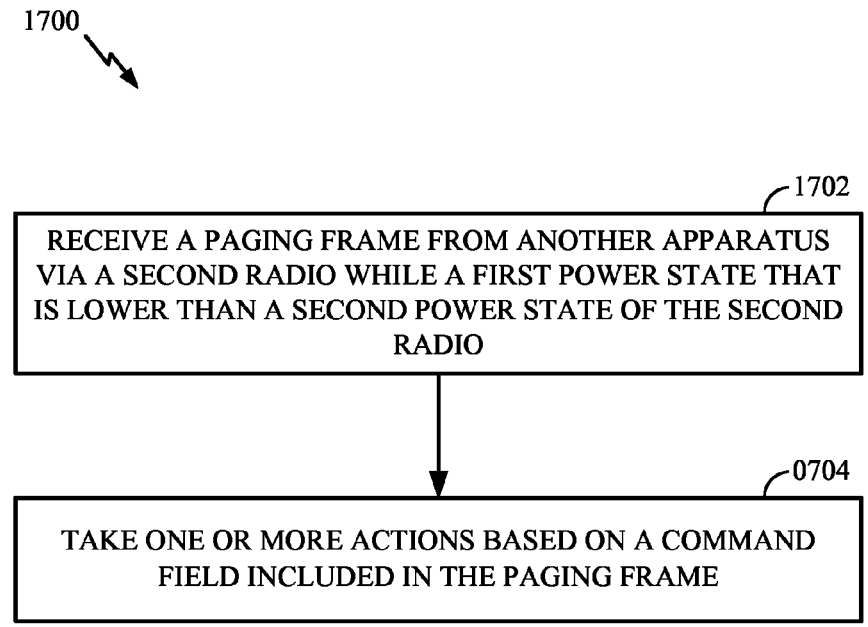
FIG. 17 illustrates example operations for wireless communications, in accordance with certain aspects of the present disclosure.

FIG. 17 illustrates example operations 1700 for wireless communications, in accordance with certain aspects of the present disclosure. Operations 1700 may be performed, for example, by a UE (e.g., UE 120). Operations 1700 may begin, at 1702, by receiving a paging frame (e.g., an ultra-low power short MAC paging frame) from another apparatus via a second radio (e.g., a companion radio for ultra-low power paging) while a first radio (e.g., a primary radio) and is in a first power state (e.g., a sleep state) that is lower than a second power state of the second radio.

At 1704, the UE may take one or more actions based on a command field (e.g., Message ID field 820 or Command field 808) included in the paging frame (e.g., in the FC field in a MAC header of the frame). According to certain aspects, the FC field may have a subfield (e.g., a Subtype subfield) set to a value that indicates a type of the paging frame. The UE may parse the command field only if the value indicates the type is a paging frame (e.g., an ultra-low power short MAC frame). According to certain aspects, the paging frame may also have a FCS field shorter than FCS fields of other types of MAC frames (e.g., 2 bytes). According to certain aspects, the paging may lack a TA field and the UE may calculate a local FCS value, based on a TA of a virtual paging frame and compare the local FCS value to a value of the FCS field received in the paging frame.

According to certain aspects, the one or more actions may include causing the first radio to exit the low power state (e.g., wake-up). According to certain aspects, the first radio may provide a configuration to the second radio, and the UE may monitor for paging frames based on the configuration. The paging frame may include a RA field and the UE take the one or more actions only if a SID associated with the UE matches a value of the RA field.

According to certain aspects, the one or more actions may include adjusting a local clock of the UE. For example, the local clock of the UE may be adjusted based on a clock value of a field in the paging frame (e.g., TX Clock LSBs). In an example implementation, the paging frame may be received from an AP, and the clock value may be the LSBs of a value of a clock associated with the AP.

According to certain aspects, the command field may indicate the other apparatus is capable of Wi-Fi Direct. In this case, the one or more actions may include causing the first radio to exit the low power state so the UE can communicate with the other apparatus via Wi-Fi Direct. For example, the second radio may notify the first radio that the other apparatus is capable of Wi-Fi Direct.

According to certain aspects, the command field may indicate the other apparatus is associated with a social group. In this case, the one or more actions may include causing the first radio to exit the low power state so the UE can listen for a discovery frame sent by a member of the social group. In an example implementation, the paging frame may include a field (e.g., Discovery Time Window field) that indicates a time offset, relative to a transmission time of the paging frame, corresponding to a next discovery window for the UE to listen for discovery frames sent by a member of the social group. The paging frame may also include a field that indicates a service ID (e.g., Service ID field) of the other apparatus and the UE may determine whether the service ID of the other apparatus matches a service ID in a list of service IDs, and cause the first radio to exit the low power state based on the determination.

According to certain aspects, the paging frame may include a field with association assist information. In this case, the one or more actions may include causing the first radio to exit the low power state to attempt association with the other apparatus using the association assist information. For example, the association assist information may include a SSID of the other apparatus and the UE may associate with the other apparatus only if the indicated SSID is in a list of relevant SSIDs (e.g., based on previous associations) stored at the UE. The association assist information may also include one or more frequency bands supported by the other apparatus and the UE may determine that the UE supports at least one of the one or more frequency bands and cause the first radio to exit the low power state based on the determination.

According to certain aspects, the UE may determine that the other apparatus transmits low-power paging frames and monitor for low-power paging frames based on the determination. For example, the UE may perform a capability exchange with the other apparatus to determine that the apparatuses support ultra-low power paging. As part of the capability exchange, the UE may receive an indication from the other apparatus that the other apparatus transmits low-power paging frames and the UE may provide an indication that the UE is capable of receiving low-power paging frames.

Figure 18:
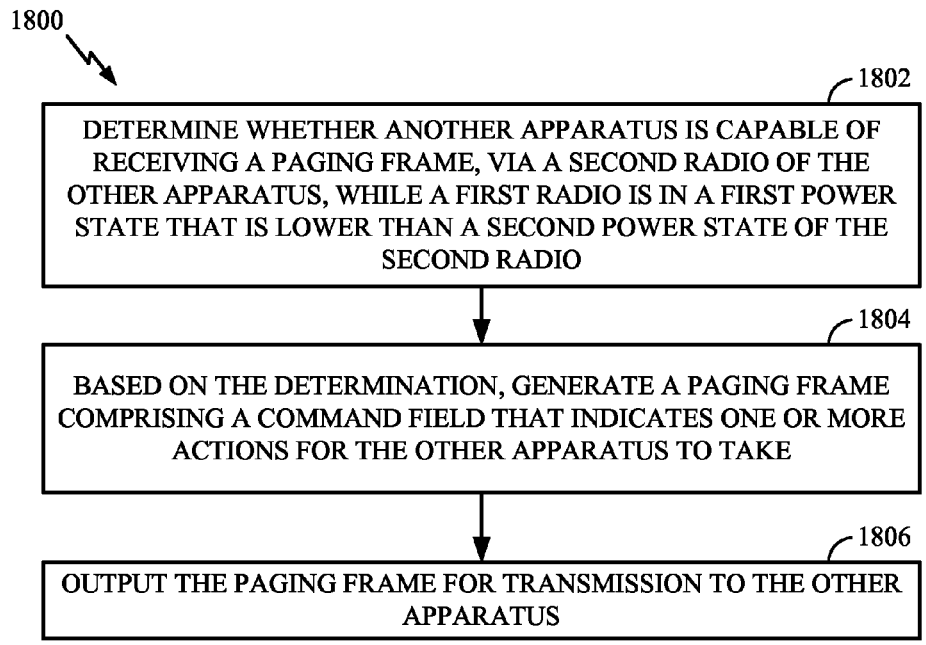
FIG. 18 illustrates example operations for wireless communications, in accordance with certain aspects of the present disclosure.
Figure 18A:
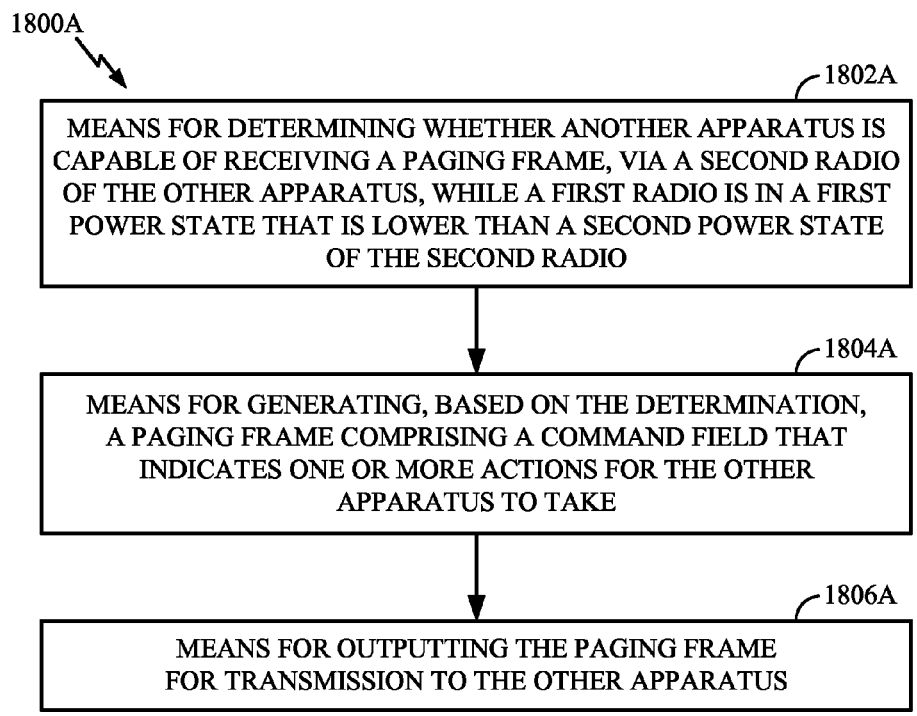
FIG. 18A illustrates example means capable of performing the operations shown in FIG. 18.

FIG. 18 illustrates example operations 1800 for wireless communications, in accordance with certain aspects of the present disclosure. Operations 1800 may be performed, for example, by an apparatus (e.g., UE 120 or AP 110). Operations 1800 may begin, at 1802, by determining whether another apparatus (e.g., a UE) is capable of receiving a paging frame, via a second radio of the other apparatus, while a first radio is in a first power state that is lower than a second power state of the second radio. For example, the apparatus may receive, as part of a capability exchange, capability information from the other apparatus indicating the other apparatus is capable of receiving low-power paging frames.

At 1804, based on the determination, the apparatus may generate a paging frame (e.g., an ultra low-power short MAC paging frame) comprising a command field (e.g., a message ID field) that indicates one or more actions for the other apparatus to take. According to certain aspects, the FC field of the paging frame may have a subfield (e.g., a Subtype subfield) set to a value that indicates a type of the paging frame. The paging frame may be a control frame, a data frame, or a management frame. According to certain aspects, the paging frame may also have a FCS field shorter than FCS fields of other types of MAC frames (e.g., 2 bytes). According to certain aspects, the paging may lack a TA field (e.g., a SA or A2 field) and a RA field (e.g., a DA or A1 field). According to certain aspects, the paging frame may include a network-wide identifier (NWID) field set to a value (e.g., SSID, SID, hashed version of an SID, hashed version of an SSID) that identifies a network to which the apparatus is associated.

At 1806, the apparatus may output the paging frame for transmission to the other apparatus. According to certain aspects, the one or more actions comprise causing the first radio to exit the low power state. According to certain aspects, the paging frame may include a RA field and the one or more action may include determining whether a SID associated with the other apparatus matches a value of the RA field and the one or more actions may include adjusting a local clock of the other apparatus. For example, the local clock of the other apparatus may be adjusted based on a clock value (e.g., LSBs of a value of a clock associated with the apparatus) of a field in the paging frame.

According to certain aspects, the command field may indicate the apparatus is capable of Wi-Fi Direct. In this case, the one or more actions may include causing the first radio to exit the low power state so the other apparatus can communicate with the apparatus via Wi-Fi Direct. For example, the apparatus may notify the first radio, via the second radio that the apparatus is capable of Wi-Fi Direct.

According to certain aspects, the command field may indicate the apparatus is associated with a social group. In this case, the one or more actions may include causing the first radio to exit the low power state so the other apparatus can listen for a discovery frame sent by a member of the social group. In an example implementation, the paging frame may include a field (e.g., Discovery Time Window field) that indicates a time offset, relative to a transmission time of the paging frame, corresponding to a next discovery window for the UE to listen for discovery frames sent by a member of the social group. The paging frame may also include a field that indicates a service ID (e.g., Service ID field) of the other apparatus and the UE may determine whether the service ID of the other apparatus matches a service ID in a list of service IDs, and cause the first radio to exit the low power state based on the determination.

According to certain aspects, the paging frame may include a field with association assist information. In this case, the one or more actions may include causing the first radio to exit the low power state to attempt association with the apparatus using the association assist information. For example, the association assist information may include a SSID of the apparatus and the other apparatus may associate with the apparatus only if the indicated SSID is in a list of relevant SSIDs (e.g., based on previous associations) stored at the other apparatus. The association assist information may also include one or more frequency bands supported by the apparatus.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

Figure 17A:
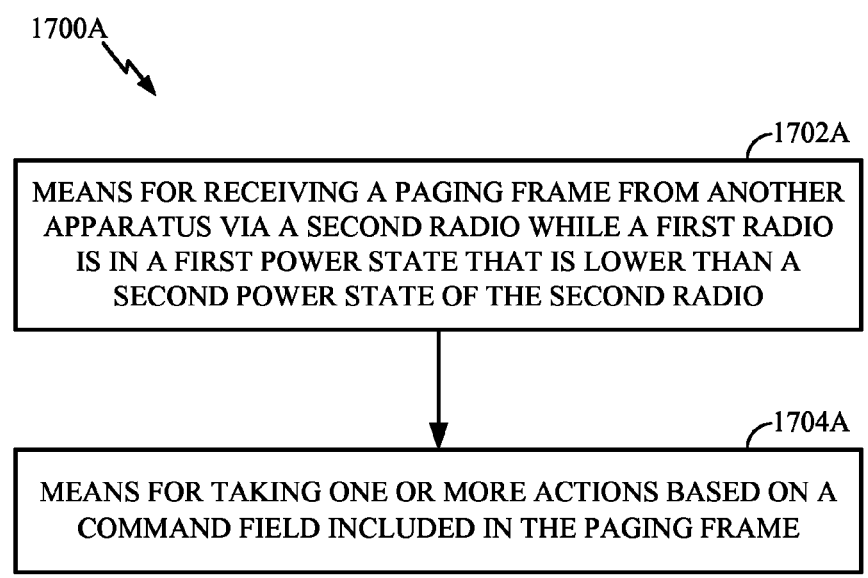
FIG. 17A illustrates example means capable of performing the operations shown in FIG. 17.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1700 and operations 1800 illustrated in FIG. 17 and FIG. 18, respectively, correspond to means 1700A and means 1800A illustrated in FIG. 17A and FIG. 18A, respectively.

For example, means for transmitting (or means for outputting for transmission) may comprise a transmitter (e.g., the transceiver 222) and/or an antenna(s) 224 of the access point 110, the transmitter (e.g., the transceiver 254) and/or antenna(s) 252 of the user terminal 120 illustrated in FIG. 2, and/or the transmitter 310 and/or antenna(s) 316 of the wireless device 302 illustrated in FIG. 3. Means for receiving (or means for obtaining) may comprise a receiver (e.g., the transceiver 222) and/or an antenna(s) 224 of the access point 110, the receiver (e.g., the transceiver 254) and/or antenna(s) 252 of the user terminal 120 illustrated in FIG. 2, and/or the receiver 312 and/or antenna(s) 316 of the wireless device 302 illustrated in FIG. 3. Means for processing, means for adjusting, means for generating, means for parsing, means for calculating, means for comparing, means for causing, means for determining, means for monitoring, means for notifying, means for computing, means for associating, means for listening, means for taking, and means for providing may comprise a processing system, which may include one or more processors, such as the RX data processor 242, the RX spatial processor 240, the TX data processor 210, the TX spatial processor 220, and/or the controller 230 of the access point 110, the RX data processor 270, the RX spatial processor 260, the TX data processor 288, the TX spatial processor 290, and/or the controller 280 of the user terminal 120 illustrated in FIG. 2, and/or the signal detector 318 and/or the processor 304 of the wireless device 302.

According to certain aspects, such means may be implemented by processing systems configured to perform the corresponding functions by implementing various algorithms (e.g., in hardware or by executing software instructions) described above for providing an immediate response indication in a PHY header. For example, an algorithm for receiving a paging frame from an apparatus via a second radio while a first radio is in a first power state that is lower than a second power state of the second radio and an algorithm for taking one or more actions based on a command field included in the paging frame. In another example, an algorithm for determining whether another apparatus is capable of receiving a paging frame, via a second radio of the other apparatus, while a first radio is in a first power state that is lower than a second power state of the second radio, an algorithm for based on the determination, generating a paging frame comprising a command field that indicates one or more actions for the other apparatus to take, and an algorithm for transmitting the paging frame to the other apparatus.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for receiving a paging frame from an apparatus via a second radio while a first radio is in a first power state that is lower than a second power state of the second radio and instructions for taking one or more actions based on a command field included in the paging frame. In another example, instructions for determining whether another apparatus is capable of receiving a paging frame, via a second radio of the other apparatus, while a first radio is in a first power state that is lower than a second power state of the second radio, instructions for based on the determination, generating a paging frame comprising a command field that indicates one or more actions for the other apparatus to take, and instructions for transmitting the paging frame to the other apparatus.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   at least one interface configured to receive via a first radio receiver and a second radio receiver, wherein the at least one interface receives a paging frame from another apparatus via the second radio receiver while the first radio receiver is in a sleep mode, wherein the paging frame comprises a medium access control (MAC) frame having a frame check sequence (FCS) field shorter than FCS fields of other types of frames and lacking a transmitter address (TA) field; and a processing system configured to:
  calculate a local FCS value, based on a TA of a virtual paging frame;
  compare the local FCS value to a value of the FCS field received in the paging frame;
  determine whether the other apparatus is a proper transmitter of the paging frame based on the comparison; and
  take one or more actions based on first field included in the paging frame.

2. The apparatus of claim 1, wherein the one or more actions comprise at least one of causing the first radio receiver to exit the sleep mode or adjusting a local clock of the apparatus.

3. The apparatus of claim 1, wherein:
the at least one interface is configured to receive, via the first radio receiver, a configuration; and
the processing system is configured to monitor for paging frames based on the configuration.

4. The apparatus of claim 1, wherein:
the at least one interface is configured to receive, as part of a capability exchange, an indication from the other apparatus that the other apparatus transmits low-power paging frames; and
the processing system is configured to monitor for low-power paging frames based on the indication.

5. The apparatus of claim 1, wherein:
the one or more actions comprise adjusting a local clock of the apparatus;
the other apparatus comprises an access point (AP);
the local clock of the apparatus is adjusted based on a clock value of a second field in the paging frame; and
the clock value comprises least significant bits (LSBs) of a value of a clock associated with the AP.

6. The apparatus of claim 1, wherein:
the first field indicates the other apparatus is capable of Wi-Fi Direct; and
the one or more actions comprise causing the first radio receiver to exit the sleep mode, so the apparatus can communicate with the other apparatus via Wi-Fi Direct.

7. The apparatus of claim 1, wherein:
the first field indicates the other apparatus is associated with a social group; and
the one or more actions comprise causing the first radio receiver to exit the sleep mode so the apparatus can listen for a discovery frame sent by one or more members of the social group.

8. The apparatus of claim 7, wherein:
the MAC frame further has a second field that indicates a time offset, relative to a transmission time of the paging frame, corresponding to a discovery window for the apparatus to listen for one or more discovery frames sent by the one or more members of the social group; and
the processing system is configured to listen for the one or more discovery frames during the discovery window.

9. The apparatus of claim 1, wherein:
the MAC frame further has a second field with association assist information; and
the one or more actions comprise causing the first radio receiver to exit the sleep mode to attempt association with the other apparatus using the association assist information.

10. The apparatus of claim 9, wherein:
the association assist information comprises a service set ID (SSID) of the other apparatus; and
the processing system is configured to associate with the other apparatus only if the SSID of the other apparatus is in a list of relevant SSIDs stored at the apparatus.

11. The apparatus of claim 9, wherein:
the association assist information comprises one or more frequency bands supported by the other apparatus;
the processing system is further configured to determine the apparatus supports at least one of the one or more frequency bands; and
the one or more actions comprises causing the first radio receiver to exit the sleep mode based on the determination.

12. The apparatus of claim 1, wherein:
the MAC frame further has a network-wide identifier (NWID) field set to a value that identifies a network to which the other apparatus is associated and a receiver address (RA) field; and
the processing system is configured to take the one or more actions only if a value of the NWID field matches a value of the RA field.

13. The apparatus of claim 12, wherein:
the NWID field comprises one of: a station identifier (SID), a service set identifier (SSID), a hashed version of an SID, or a hashed version of an SSID; and
the processing system is configured to take the one or more actions only if the SID, the SSID, the hashed version of the SID, or the hashed version of the SSID matches the value of the RA field.

14. The apparatus of claim 1, wherein the first field is a command field.

15. A method for wireless communications by an apparatus, comprising:
  receiving via a first radio receiver and a second radio receiver, wherein the apparatus receives a paging frame from another apparatus via the second radio receiver while the first radio receiver is in a sleep mode, wherein the paging frame comprises a medium access control (MAC) frame having a frame check sequence (FCS) field shorter than FCS fields of other types of frames and lacking a transmitter address (TA) field;
  calculating a local FCS value, based on a TA of a virtual paging frame;
  comparing the local FCS value to a value of the FCS field received in the paging frame;
  determining whether the other apparatus is a proper transmitter of the paging frame based on the comparison; and
  taking one or more actions based on a first field included in the paging frame.

16. The method of claim 15, wherein the one or more actions comprise at least one of causing the first radio receiver to exit the sleep mode or adjusting a local clock of the apparatus.

17. The method of claim 15, further comprising:
receiving, via the first radio receiver, a configuration; and
monitoring for paging frames based on the configuration.

18. The method of claim 15, further comprising:
receiving, as part of a capability exchange, an indication from the other apparatus that the other apparatus transmits low-power paging frames; and
monitoring for low-power paging frames based on the indication.

19. The method of claim 15, wherein:
the one or more actions comprise adjusting a local clock of the apparatus;
the other apparatus comprises an access point (AP);

the local clock of the apparatus is adjusted based on a clock value of a second field in the paging frame; and the clock value comprises least significant bits (LSBs) of a value of a clock associated with the AP.

20. The method of claim 15, wherein:

the first field indicates the other apparatus is capable of Wi-Fi Direct; and the one or more actions comprise causing the first radio receiver to exit the sleep mode, so the apparatus can communicate with the other apparatus via Wi-Fi Direct.

21. The method of claim 15, wherein:

the first field indicates the other apparatus is associated with a social group; and the one or more actions comprise causing the first radio receiver to exit the sleep mode so the apparatus can listen for a discovery frame sent by one or more members of the social group.

22. The method of claim 21, wherein:

the MAC frame further has a second field that indicates a time offset, relative to a transmission time of the paging frame, corresponding to a discovery window for the apparatus to listen for one or more discovery frames sent by the one or more members of the social group; and the method further comprising:

listening for the one or more discovery frames during the discovery window.

23. The method of claim 15, wherein:

the MAC frame further has a second field with association assist information; and the one or more actions comprise causing the first radio receiver to exit the sleep mode to attempt association with the other apparatus using the association assist information.

24. The method of claim 23, wherein:

the association assist information comprises a service set ID (SSID) of the other apparatus; and the method further comprising:

associating with the other apparatus only if the SSID of the other apparatus is in a list of relevant SSIDs stored at the apparatus.

25. The method of claim 23, wherein:

the association assist information comprises one or more frequency bands supported by the other apparatus; and the method further comprising:

determining the apparatus supports at least one of the one or more frequency bands, wherein the one or more actions comprise causing the first radio receiver to exist the sleep mode based on the determination.

26. The method of claim 15, wherein:

the MAC frame further has a network-wide identifier (NWID) field set to a value that identifies a network to which the other apparatus is associated and a receiver address (RA) field; and the taking the one or more actions comprises taking the one or more actions only if a value of the NWID field matches a value of the RA field.

27. The method of claim 26, wherein:

the NWID field comprises one of: a station identifier (SID), a service set identifier (SSID), a hashed version of an SID, or a hashed version of an SSID; and the taking the one or more actions comprises taking the one or more actions only if the SID, the SSID, the hashed version of the SID, or the hashed version of the SSID matches the value of the RA field.

28. The method of claim 15, wherein the first field is a command field.

29. A non-transitory computer readable medium having computer executable code, for wireless communications by an apparatus, stored thereon for:

receiving via a first radio receiver and a second radio receiver, wherein the apparatus receives a paging frame from another apparatus via the second radio receiver while the first radio receiver is in a sleep mode, wherein the medium access control (MAC) frame having a frame check sequence (FCS) field shorter than FCS fields of other types of frames and lacking a transmitter address (TA) field;

calculating a local FCS value, based on a TA of a virtual paging frame;

comparing the local FCS value to a value of the FCS field received in the paging frame;

determining whether the other apparatus is a proper transmitter of the paging frame based on the comparison; and taking one or more actions based on another field included in the paging frame.

30. The non-transitory computer readable medium of claim 29, wherein the other field is a command field.

31. An access terminal, comprising:

a first radio receiver;

a second radio receiver configured to receive a paging frame from a device while the first radio receiver is in a sleep mode, wherein the paging frame comprises a medium access control (MAC) frame having a frame check sequence (FCS) field shorter than FCS fields of other types of frames and lacking a transmitter address (TA) field; and a processing system configured to:

calculate a local FCS value, based on a TA of a virtual paging frame;

compare the local FCS value to a value of the FCS field received in the paging frame;

determine whether the device is a proper transmitter of the paging frame based on the comparison; and take one or more actions based on another field included in the paging frame.

32. The access terminal of claim 31, wherein the other field is a command field.

* * * * *